(12) United States Patent
Yoshida et al.

(10) Patent No.: US 12,045,044 B2
(45) Date of Patent: Jul. 23, 2024

(54) TRANSPORT ROBOT, TRANSPORT SYSTEM, AND TRANSPORT METHOD

(71) Applicant: NEC Corporation, Tokyo (JP)

(72) Inventors: Hiroshi Yoshida, Tokyo (JP); Ryusuke Tsushima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 809 days.

(21) Appl. No.: 17/262,550

(22) PCT Filed: Jul. 26, 2019

(86) PCT No.: PCT/JP2019/029401
§ 371 (c)(1),
(2) Date: Jan. 22, 2021

(87) PCT Pub. No.: WO2020/022479
PCT Pub. Date: Jan. 30, 2020

(65) Prior Publication Data
US 2022/0350319 A1 Nov. 3, 2022

(30) Foreign Application Priority Data

Jul. 27, 2018 (JP) .................... 2018-141332

(51) Int. Cl.
*G05B 19/418* (2006.01)
*B66F 9/06* (2006.01)
*G05D 1/00* (2024.01)
(52) U.S. Cl.
CPC ........ *G05B 19/41895* (2013.01); *B66F 9/063* (2013.01); *G05D 1/0293* (2013.01)

(58) Field of Classification Search
CPC ............... G05B 19/41895; B66F 9/063; B66F 9/07513; B66F 9/0755; G05D 1/0293; G05D 2201/0216; B65G 35/00
See application file for complete search history.

(56) References Cited

U.S. PATENT DOCUMENTS

| 6,453,212 B1 | 9/2002 | Asama et al. |
| 2015/0142249 A1 | 5/2015 | Ooga et al. |
| 2015/0239580 A1* | 8/2015 | Valenzuela ........... B66F 9/0755 701/50 |

(Continued)

FOREIGN PATENT DOCUMENTS

| JP | H09-261936 A | 10/1997 |
| JP | H11-198067 A | 7/1999 |
| JP | 2000-042958 A | 2/2000 |

(Continued)

OTHER PUBLICATIONS

Hichri, Bassem, et al. "Design of cooperative mobile robots for co-manipulation and transportation tasks." Robotics and computer-integrated manufacturing 57 (2019): 412-421. (Year: 2019).*

(Continued)

*Primary Examiner* — Russell Frejd
*Assistant Examiner* — Ana D Thomas
(74) *Attorney, Agent, or Firm* — Sughrue Mion, PLLC

(57) ABSTRACT

A transport robot is configured to transport a transported object(s) in a state of sandwiching the transported object(s) by cooperating with another transport robot when transporting the transported object(s).

8 Claims, 27 Drawing Sheets

(56) References Cited

U.S. PATENT DOCUMENTS

2017/0364073 A1  12/2017  Guy

FOREIGN PATENT DOCUMENTS

| JP | 2001-213597 | A | 8/2001 |
|----|-------------|---|--------|
| JP | 2001-255939 | A | 9/2001 |
| JP | 2004-337918 | A | 12/2004 |
| JP | 2007-111826 | A | 5/2007 |
| JP | 2009-006415 | A | 1/2009 |
| JP | 2011-216007 | A | 10/2011 |
| JP | 5588714 | B2 | 9/2014 |
| JP | 2015-099524 | A | 5/2015 |
| JP | 2015-162249 | A | 9/2015 |
| JP | 6151159 | B2 | 6/2017 |

OTHER PUBLICATIONS

Hirata, Yasuhisa, et al. "Coordinated transportation of a single object by multiple mobile robots without position information of each robot." Proceedings. 2000 IEEE/RSJ International Conference on Intelligent Robots and Systems (IROS 2000)(Cat. No. 00CH37113). vol. 3. IEEE, 2000. (Year: 2000).*

Arai, Tamio, and Jun Ota. "Let us work together—Task planning of multiple mobile robots." Proceedings of IEEE/RSJ International Conference on Intelligent Robots and Systems. IROS'96. vol. 1. IEEE, 1996. (Year: 1996).*

Machado, Toni, et al. "Multi-constrained joint transportation tasks by teams of autonomous mobile robots using a dynamical systems approach." 2016 IEEE international conference on robotics and automation (ICRA). IEEE, 2016. (Year: 2016).*

Japanese Office Action for JP Application No. 2020-532498 mailed on Mar. 8, 2022 with English Translation.

JP Office Action for JP Application No. 2020-532498, mailed on Jul. 12, 2022 with English Translation.

International Search Report for PCT Application No. PCT/JP2019/029401, mailed on Oct. 29, 2019.

Hirata, Yasuhisa et al., "Transportation of an Object with Unknown Shape by Multiple Mobile Robots in Coordination", Proceedings of the 18th Annual Conference of the Robotics Society of Japan, Sep. 12, 2000, vol. 3, pp. 1025-1026, 3C15, Japan.

* cited by examiner

TRANSPORT ROBOT, TRANSPORT SYSTEM, AND TRANSPORT METHOD

FIELD

Description of Related Application

The present invention is a National Stage Entry of PCT/JP2019/029401 filed on Jul. 26, 2019, which is based on claiming priority of Japanese Patent Application: JP2018-141332 (filed on Jul. 27, 2018), the entire contents of the application shall be incorporated and stated in the present application by reference.

The present invention relates to a transport robot, a transport system, and a transport method.

BACKGROUND

There are the following as a transport system in which a plurality of transport robots collaborate (cooperate) to transport an object to be transported (herein termed as "transported object").

For example, in transport systems of patent literatures (PTLs) 1 and 2, it is configured to transport a transported object, by installing a turntable (positional error absorption mechanism) in each of a plurality of transport robots; and arranging a transported object (freight) so as to straddle between the plurality of turntables.

Also, in a transport system of PTL 3, it is configured to transport a transported object, by providing an arm and a hand for each of a plurality of transport robots, and rotatably supporting the transported object from below with a plurality of hands.

Further, in a transport system of patent literature 4, it is configured to transport a transported object, by providing a robot arm and a hook for each of a plurality of transport robots, and craning the transported object with a plurality of hooks.

Furthermore, in a transport system of PTL 5, it is configured to transport a transported object, by providing a movable arm and a gripping mechanism for each of a plurality of transport robots, and gripping the transported object due to a plurality of gripping mechanisms.

[PTL 1] JP6151159B
[PTL 2] JP5588714B
[PTL 3] JP2000-42958A
[PTL 4] JP2007-111826A
[PTL 5] JP2009-6415A

SUMMARY

The following analysis is given by the inventors of the present application.

In the transport systems of PTLs 1 and 2, a hand or transport robot for transporting the transported object on the turntable is required. Also, in the logistics business (transport business), in order to make it easy to move, although a freight is often carried on a moving cart (including a dolly), in the transportation systems of PTLs 1 and 2, it is not possible to transport a moving cart while keeping a freight placed on the moving cart.

Also, in the transport system of PTL 3, it is necessary to provide a support rod on a transported object so that it can be supported by a hand, and it is not possible to transport the transported object without the support rod.

Further, in the transport system of PTL 4, it is necessary to attach an eyebolt to a transported object so that it can be hung by a hook, and the transported object to which the eyebolt cannot be attached cannot be transported.

Furthermore, in the transport system of PTL 5, it is necessary to provide a grip part on a transported object so that it can be gripped by a grip mechanism, and it is not possible to transport the transported object without the grip part.

In logistics operations, although moving carts of various types (shape, size, etc.) are used depending on the shipper, etc., it is desired to be able to transport a moving cart (transported object) on which the freight is placed without modifying it.

It is a main object of the present invention to provide a transport robot, a transport system, and a transport method capable of contributing to transporting various types (or forms) of transported object(s) as it is without reloading the transported object(s) and without modifying it.

A transport robot according to a first aspect is configured to transport a transported object(s) in a state of sandwiching the transported object(s) by cooperating with another transport robot when transporting the transported object(s).

A transport system according to a second aspect that comprises a plurality of transport robots that transport a transported object(s), is configured to transport a transported object(s) in a state of sandwiching the transported object(s) by cooperating with a plurality of transport robots when transporting the transported object(s).

A transport method according to a third aspect that uses a plurality of transport robots to transport a transported object(s), wherein the transport method comprises transporting a transported object(s) in a state of sandwiching the transported object(s) by cooperating with a plurality of transport robots when transporting the transported object(s).

According to the first to third aspects, it is possible to contribute to transporting various types (or forms) of transported object(s) as it is without reloading the transported object(s) and without modifying it.

PREFERRED MODES

Figure 1:
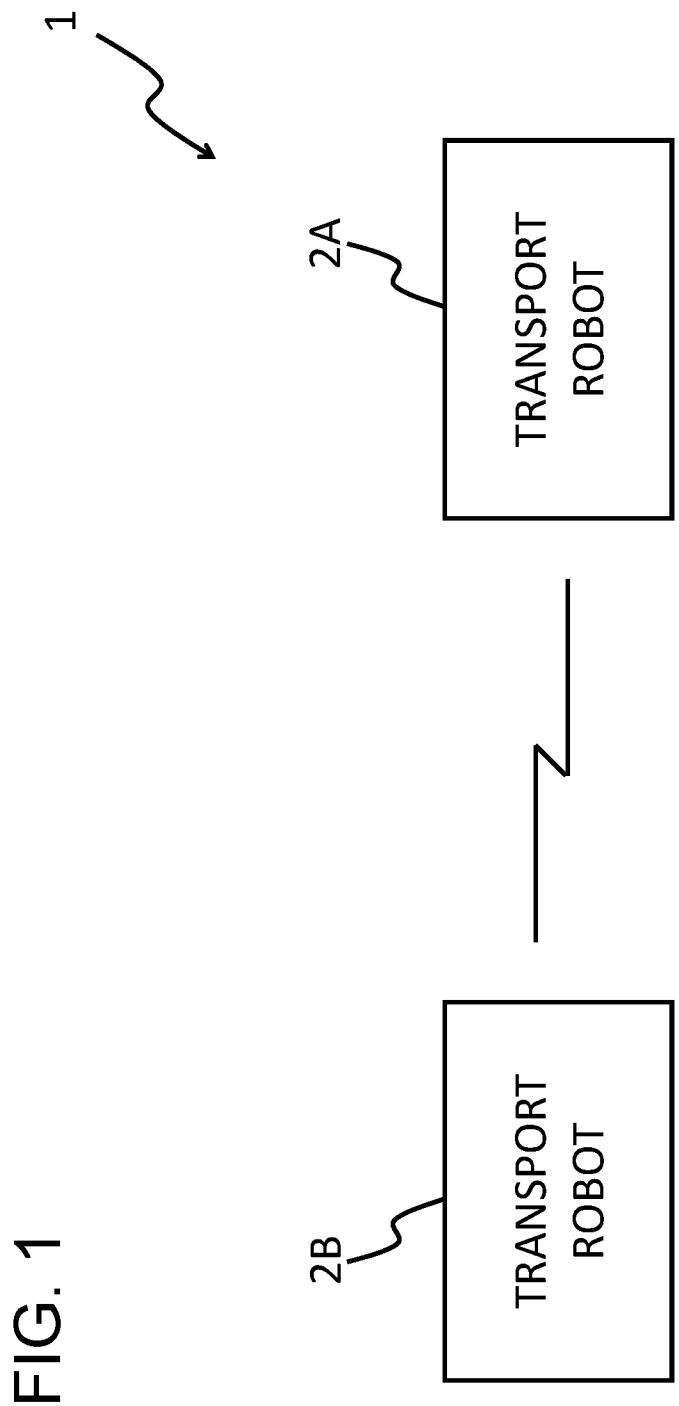
FIG. 1 is a block diagram schematically showing a configuration of a transport system according to a first exemplary embodiment.

In the present invention, as a transport robot according to mode 1, the mode (mode 1) of a transport robot according to a first aspect is possible, and the following deformation modes can be appropriately selected and combined.

As a modification mode of the transport robot according to mode 1, the other transport robot can have the same configuration as the transport robot.

As a modification mode of the transport robot according to mode 1, the transported object can be a moving cart having pivotable wheels on a pedestal on which goods are placed.

As a modification mode of the transport robot according to mode 1, the transport robot can comprise: a main body; a contact part that contacts the transported object(s); and a rotation mechanism having an arm(s), the contact part being attached to one end of the arm(s), and the arm(s) being rotatably supported to the main body in the vicinity of the other end of the arm(s).

As a modification mode of the transport robot according to mode 1, the rotation mechanism can comprise a restoration mechanism that restores the contact part in a state of being rotated from a predetermined position so that the contact part is returned to the predetermined position.

As a modification mode of the transport robot according to mode 1, the restoration mechanism can comprise an elastic member.

As the modification mode of the transport robot according to mode 1, the rotation mechanism can comprise an attenuation mechanism that attenuates vibration of the restoration mechanism.

As a modification mode of the transport robot according to mode 1, the attenuation mechanism can attenuate vibration of the restoration mechanism by friction, viscosity, or hysteresis.

As a modification mode of the transport robot according to mode 1, the transport robot can comprise a pair of wheels rotatably attached to both sides of the main body, and the rotation mechanism can make the arm rotatable relative to the main body about an axis passing through a midpoint of width between the pair of wheels.

As a modification mode of the transport robot according to mode 1, the contact part can comprise a friction part to cause friction force with the transported object to increase on a contact surface with the transported object.

As a modification mode of the transport robot according to mode 1, the contact part can comprise a fork part that enables the transported object to be lifted from below, and the transport robot can comprise an elevation mechanism that enables the contact part to be elevated (lifted and lowered).

As a modification mode of the transport robot according to mode 1, the transport robot can comprise a guide mechanism that is attached to the main body; guides rotation of the contact part relative to the main body; and supports pressing of the contact part to the transported object.

As a modification mode of the transport robot according to mode 1, the guide mechanism can comprise: a guide member attached to the main body and having a guide surface; and a roller(s) rotatably attached to the contact part and rotating on the guide surface.

As a modification mode of the transport robot according to mode 1, the transport robot can comprise: a pair of drive parts that is attached to the main body and drives the pair of wheels; a control part that controls the pair of drive parts; and a communication part, wherein the control part is connected communicatably with the other transport robot via the communication part, and controls the pair of drive parts by cooperating (collaborating) with the other transport robot.

As a modification mode of the transport robot according to mode 1, the transport robot can comprise a load sensor that detects a load when the contact part and the transported object contact each other, and the control part can control the pair of drive parts so that the load when the contact part and the transported object contact each other falls within a predetermined numerical range based on a detected load by the load sensor.

As a modification mode of the transport robot according to mode 1, the contact part can comprise: two plates; and an elastic member arranged between the two plates, and the load sensor can detect the load when the contact part and the transported object contact each other by detecting distance between the two plates.

As a modification mode of the transport robot according to mode 1, the load sensor can be a piezoelectric sensor or a strain gauge.

As a modification mode of the transport robot according to mode 1, the rotation mechanism can comprise an angle sensor that detects rotation angle of the contact part relative to the main body; and the control part can control the pair of drive parts so that the rotation angle of the contact part relative to the main body becomes an angle set according to a traveling direction based on an angle detected by the angle sensor.

As a modification mode of the transport robot according to mode 1, the angle sensor can be a position encoder for angle measurement connected to a rotating portion of the rotation mechanism.

As a modification mode of the transport robot according to mode 1, the transport robot can comprise a rotation drive part that drives the horizontal rotation of the contact part relative to the main body, and the control part can control the rotation drive part so that the angle of the contact part relative to the main body becomes an angle set according to a traveling direction based on the angle detected by the angle sensor.

As a modification mode of the transport robot according to mode 1, the transport robot can comprise an obstacle detection part that detects an obstacle(s) around the transport robot, and the control part can control the pair of drive parts so as to avoid the obstacle(s) when detecting the obstacle(s) by the obstacle detection part.

As a modification mode of the transport robot according to mode 1, the transport robot can comprise a position detection part that detects a position of the transport robot, and the control part can control the pair of drive parts based on the position detected by the position detection part.

In the present invention, as a transport system according to mode 2, the mode (mode 2) of the transport system according to the second aspect is possible, and the following modification modes can be appropriately selected and combined.

As a modification mode of the transport system according to mode 2, the transport system can be configured to transport the transported object in a state of sandwiching front and back or left and right of the transported object by cooperating with a plurality of transport robots when transporting the transported object.

As a modification mode of the transport system according to mode 2, the transport system can be configured to support the transported object by arranging at least two transport robots among the plurality of transport robots in parallel or in series on at least one of the front, rear, right, and left of the transported object.

As a modification mode of the transport system according to mode 2, the plurality of transport robots can be communicatably connected to each other, and the plurality of transport robots can be controlled in a state where at least one of the plurality of transport robots is autonomous.

As a modification mode of the transport system according to mode 2, the transport system can comprise a control apparatus that is communicatably connected to each of the plurality of transport robots and controls the plurality of transport robots.

As a modification mode of the transport system according to mode 2, the transport robot (including the modification mode) according to mode 1 can be used as the plurality of transport robots.

In the present invention, as a transport method according to mode 3, the mode (mode 3) of the transport method according to the third aspect is possible.

In the transport method according to mode 3, the transport robot (including the modification mode) according to mode 1 can be used for the plurality of transport robots.

In a transport method according to mode 3, the transport system (including the modification mode) according to mode 2 can be used.

Hereinafter, exemplary embodiments will be described with reference to drawings. It should be noted that, when the drawing reference signs are attached in the present application, they are for the purpose of assisting understanding only, and are not intended to be limited to illustrated exemplary embodiments. Also, the following exemplary embodiments are merely examples, and do not limit the present invention.

FIRST EXEMPLARY EMBODIMENT

Figure 2:
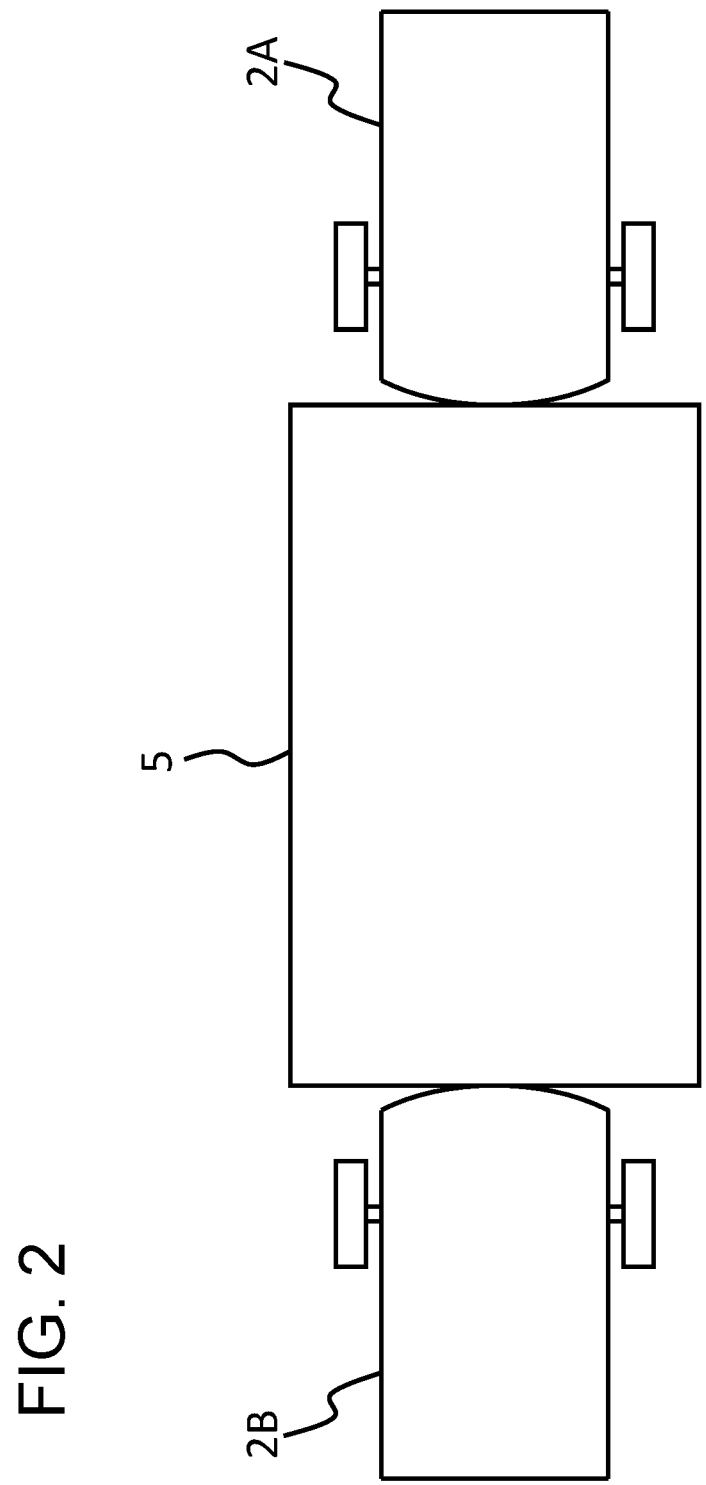
FIG. 2 is a plan view schematically showing a state in which the transport system according to the first exemplary embodiment is transporting a transported object.
Figure 3:
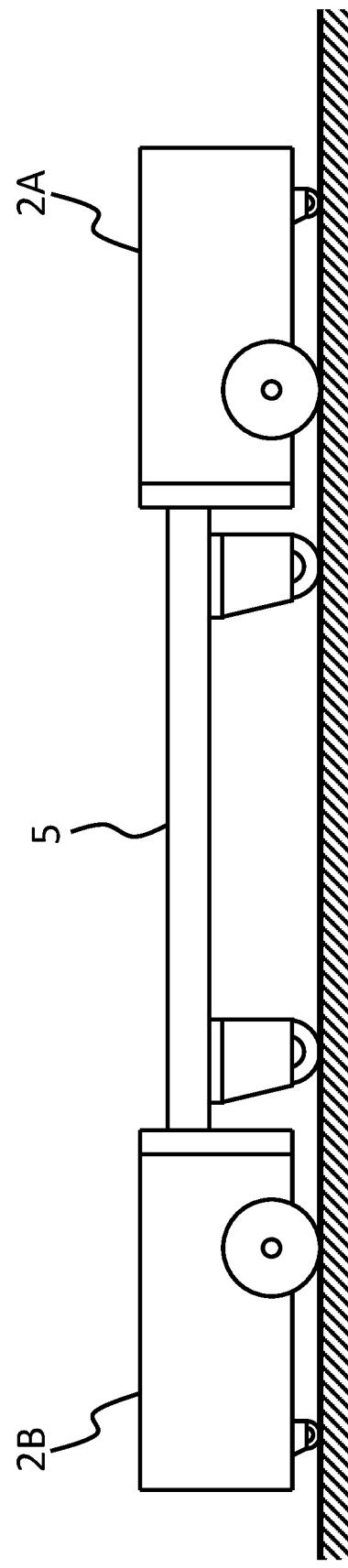
FIG. 3 is a side view schematically showing the state in which the transport system according to the first exemplary embodiment is transporting the transported object.

A transport system according to a first exemplary embodiment will be described with reference to drawings. FIG. 1 is a block diagram schematically showing a configuration of the transport system according to the first exemplary embodiment. FIG. 2 is a plan view schematically showing a state in which the transport system according to the first exemplary embodiment is transporting a transported object. FIG. 3 is a side view schematically showing a state in which the transport system according to the first exemplary embodiment is transporting the transported object.

The transport system 1 is a system comprising a plurality (two in FIG. 1; three or more are possible) of transport robots 2A and 2B (see FIG. 1). the transport robots 2A and 2B transport a transported object 5 in a sandwiched state by cooperating with each other when transporting the transported object 5 (see FIGS. 2 and 3). As the transported object 5, a moving cart comprising a plurality of pivotable wheels as a pedestal on which a freight is placed, can be used. Also, the plurality of transport robots 2A and 2B may be configured to cooperate with each other by connecting communicatably with each other (whether wireless communication or wired communication).

According to the first exemplary embodiment, when transporting the transported object 5, by transporting the transported object 5 in a state of sandwiching the transported object 5 between the plurality of transport robots 2A and 2B, it is possible to contribute to transporting various types (or forms) of the transported object 5 as it is without reloading (i.e. changing of loading) the transported object 5.

SECOND EXEMPLARY EMBODIMENT

Figure 4:
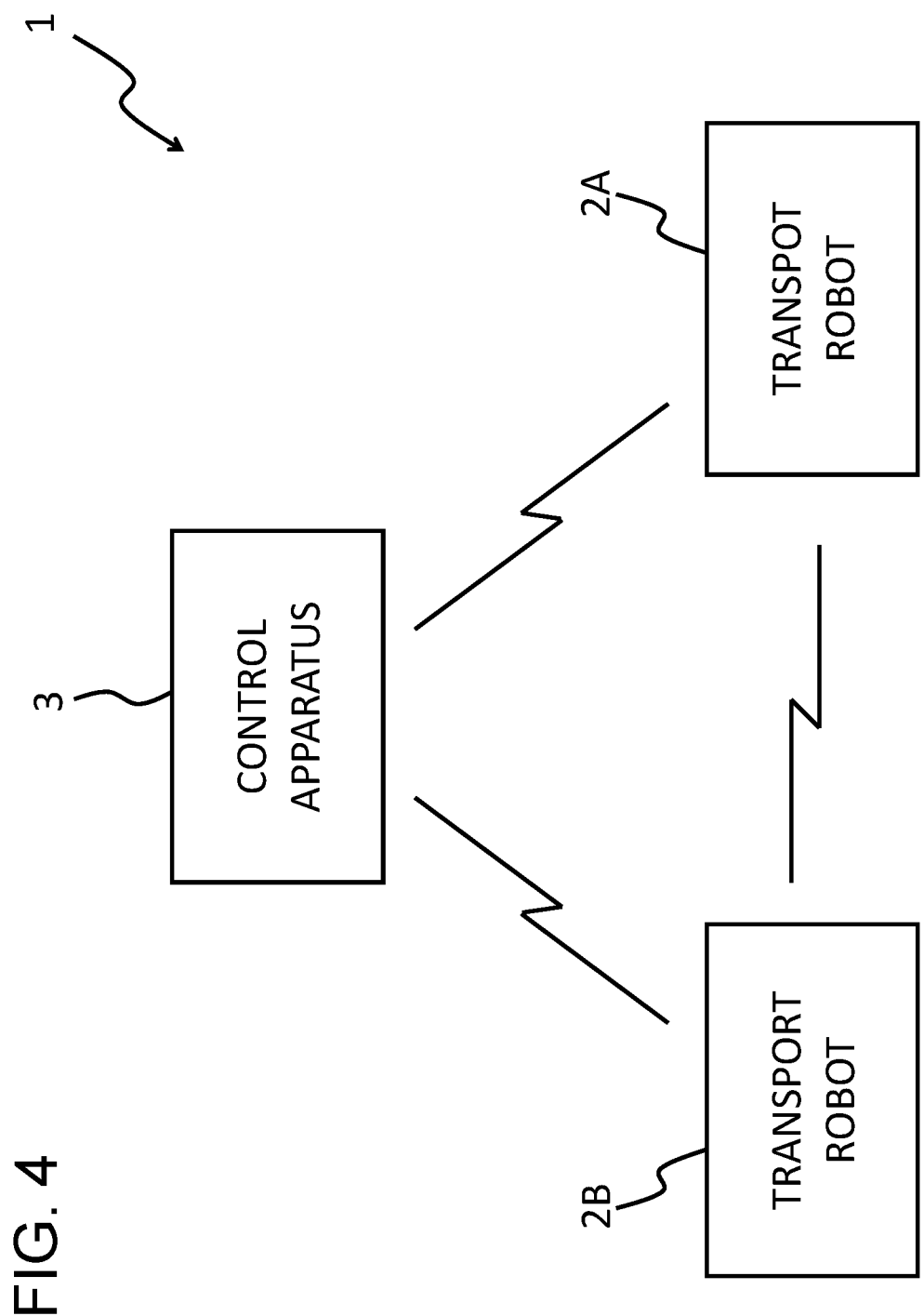
FIG. 4 is a block diagram schematically showing a configuration of a transport system according to a second exemplary embodiment.

A transport system according to a second exemplary embodiment will be described with reference to the drawings. FIG. 4 is a block diagram schematically showing a configuration of the transport system according to the second exemplary embodiment.

The second exemplary embodiment is a modification of the first exemplary embodiment and is configured to control a plurality of transport robots 2A and 2B by using a control apparatus 3. The control apparatus 3 is connected communicatably to each of the plurality of transport robots 2A and 2B (irrespective of wireless communication or wired communication). The control apparatus 3 may control the plurality of transport robots 2A and 2B based on shooting data from a camera(s) (not shown) that shoots the plurality of transport robots 2A and 2B. The other configurations are the same as the first exemplary embodiment.

According to the second exemplary embodiment, when transporting the transported object 5, by controlling the plurality of transport robots 2A and 2B due to using the control apparatus 3 to transport the transported object 5 in a state of sandwiching the transported object 5 between the plurality of transport robots 2A and 2B, similarly to the first exemplary embodiment, it is possible to contribute to transporting various types (or forms) of freight(s) as it is without reloading the freight(s).

THIRD EXEMPLARY EMBODIMENT

Figure 5:
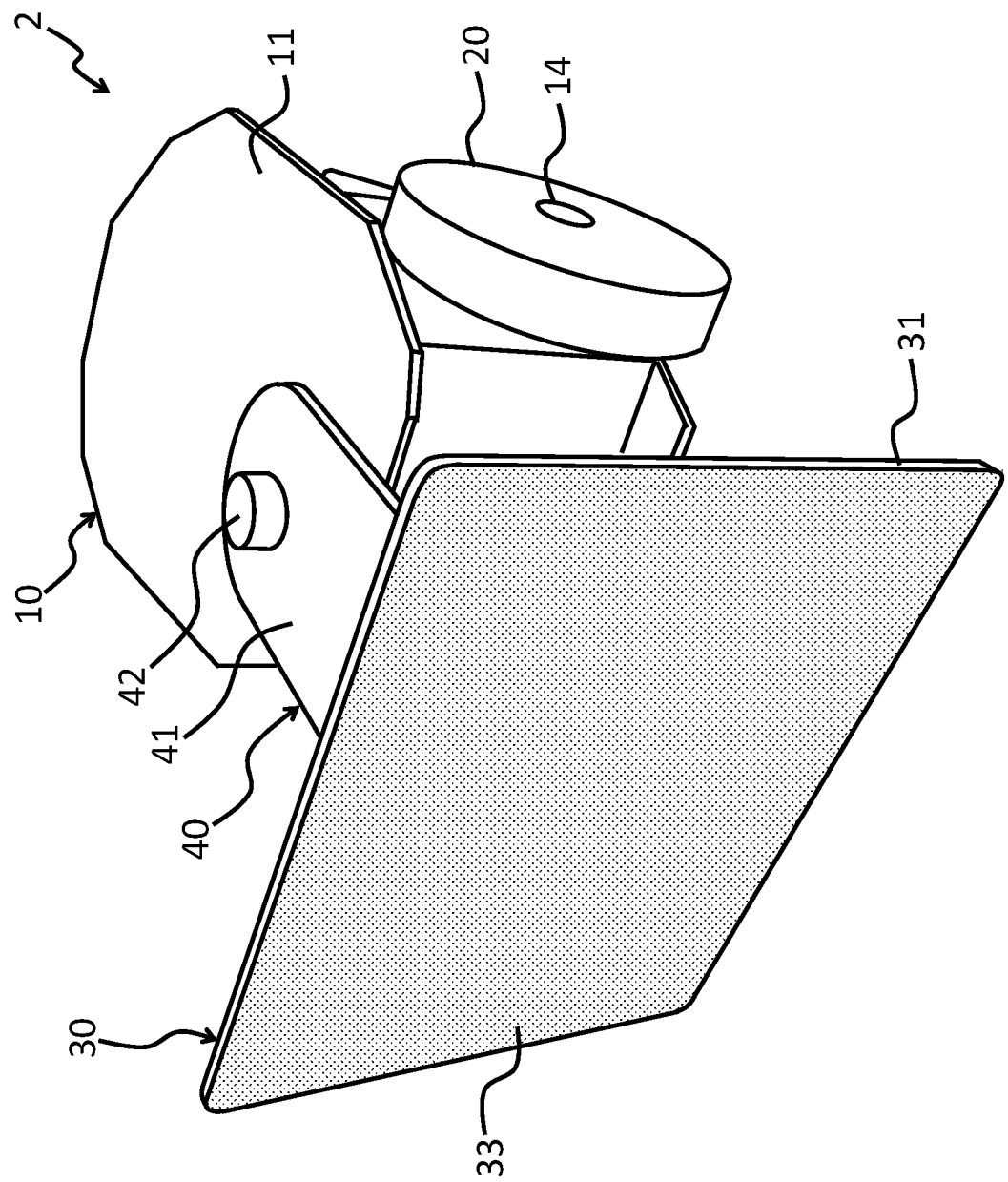
FIG. 5 is an external perspective view schematically showing a configuration of a transport robot in a transport system according to a third exemplary embodiment.
Figure 6:
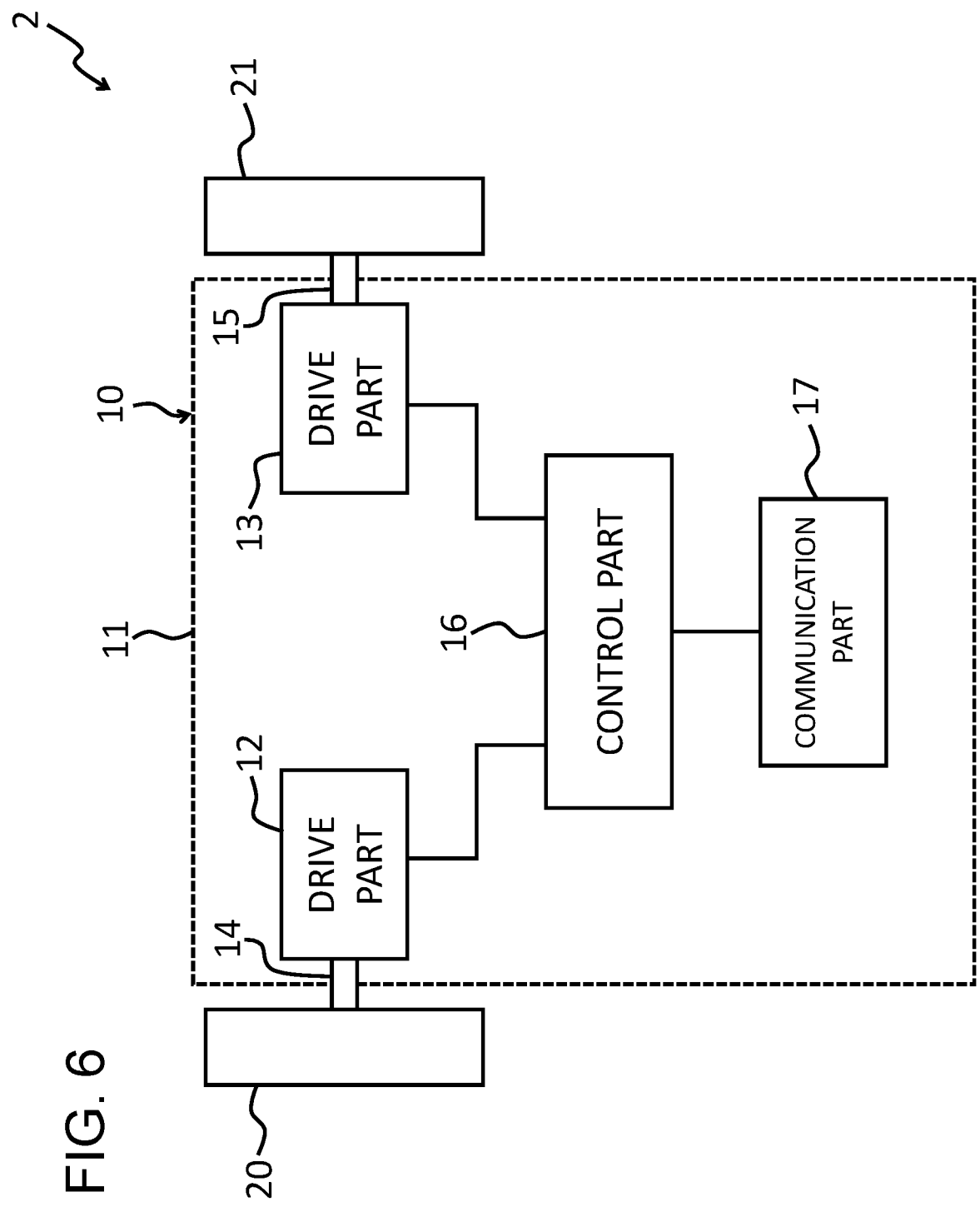
FIG. 6 is a block diagram schematically showing a circuit configuration of a main body of the transport robot in the transport system according to the third exemplary embodiment.
Figure 7:
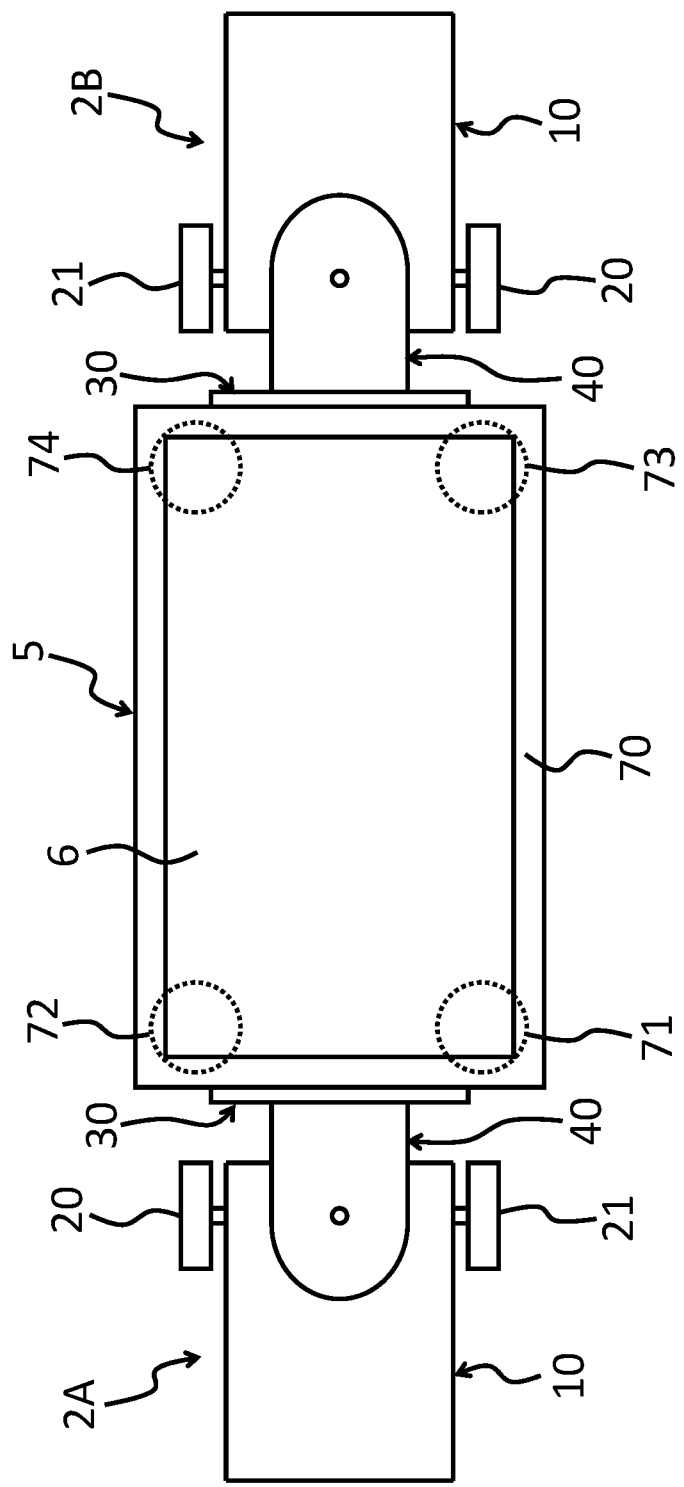
FIG. 7 is a plan view schematically showing a first example of a state in which the transport system according to the third exemplary embodiment is transporting a transported object.
Figure 8:
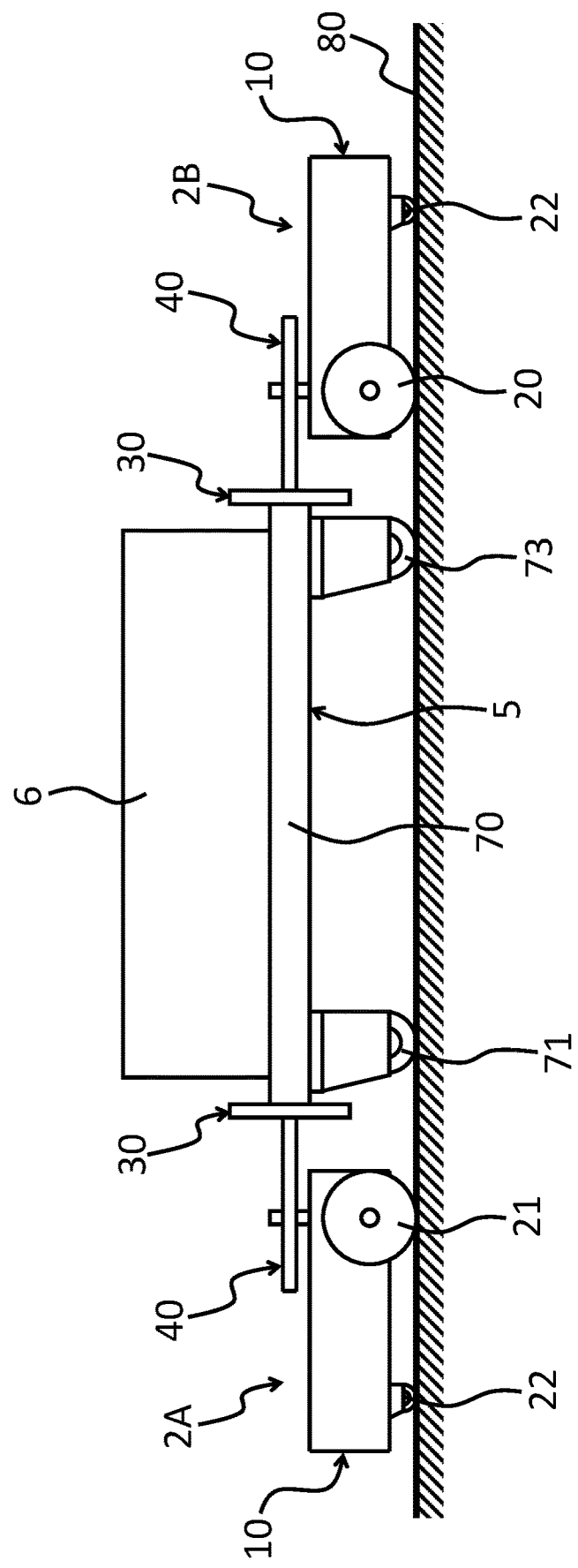
FIG. 8 is a side view schematically showing the first example of the state in which the transport system according to the third exemplary embodiment is transporting the transported object.
Figure 9:
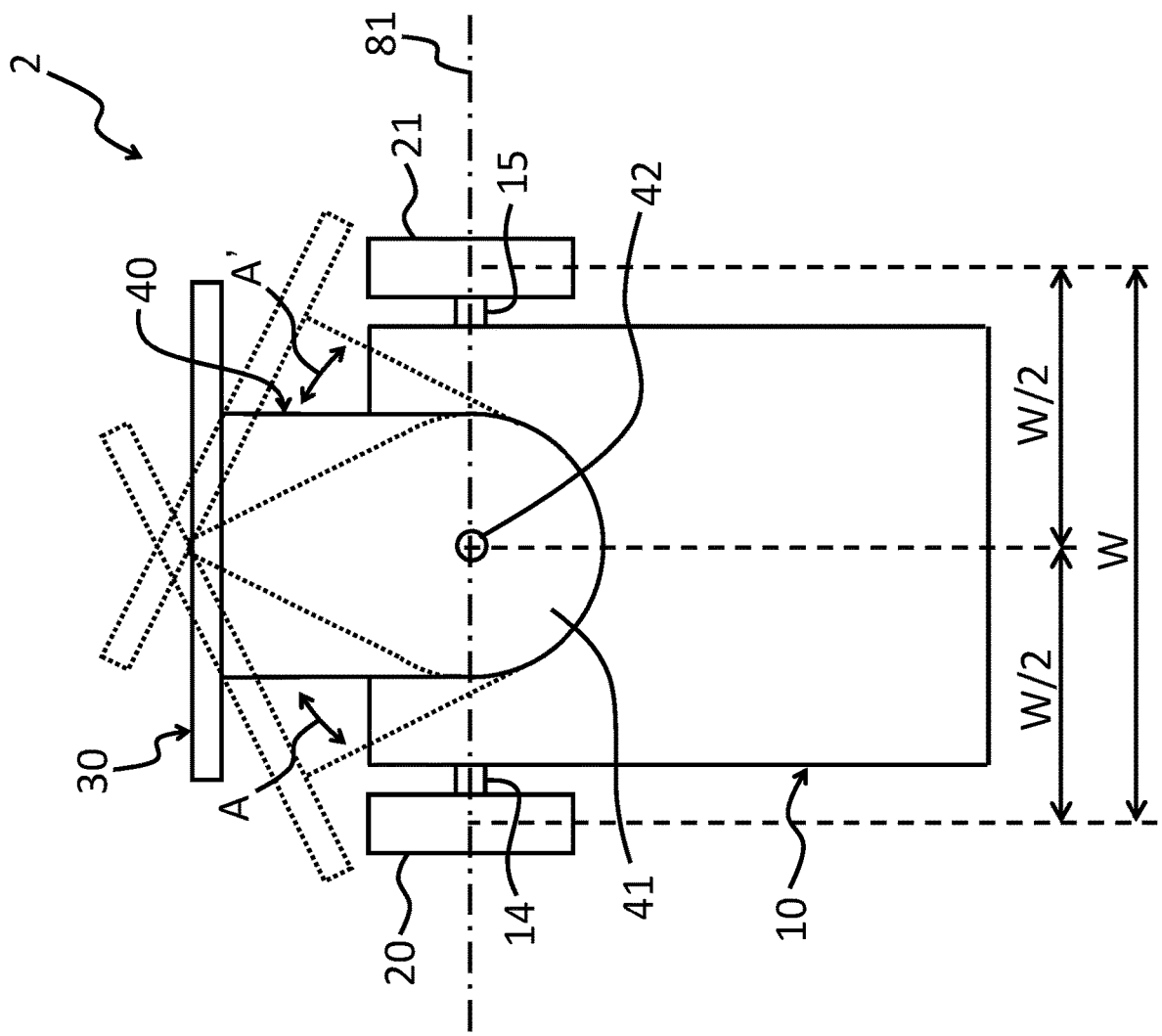
FIG. 9 is a plan view for explaining an operation of a rotation mechanism of the transport robot in the transport system according to the third exemplary embodiment.

A transport system according to a third exemplary embodiment will be described with reference to the drawings. FIG. 5 is an external perspective view schematically showing a configuration of a transport robot in the transport system according to the third exemplary embodiment. FIG. 6 is a block diagram schematically showing a circuit configuration of a main body of the transport robot in the transport system according to the third exemplary embodiment. FIG. 7 is a plan view schematically showing a first example of a state in which the transport system according to the third exemplary embodiment is transporting a transported object. FIG. 8 is a side view schematically showing the first example of the state in which the transport system according to the third exemplary embodiment is transporting a transported object. FIG. 9 is a plan view for explaining an operation of a rotation mechanism of the transport robot in the transport system according to the third exemplary embodiment.

The third exemplary embodiment is a modification of the first and second exemplary embodiments and is configured to provide a contact part 30 and a rotation mechanism 40 on the main body 10 of the transport robot 2 (corresponding to 2A and 2B in FIGS. 1 and 2) (see FIG. 5).

The transport robot 2 (for example, 2A in FIGS. 7 and 8) is a robot that transports a transported object in a state of sandwiching the transported object, by cooperating with the other transport robot 2 (for example, 2B in FIGS. 7 and 8), when transporting the transported object (for example, 5 in FIGS. 7 and 8) (see FIGS. 5 to 9). The transport robot 2 comprises: a main body 10; a contact part 30; and a rotation mechanism 40.

The main body 10 is a unit comprising basic components (11 to 17, 20 to 22 in FIG. 6) for functioning as a transport robot (see FIGS. 5 to 9). The main body 10 comprises a frame 11 and implements (or installs) various components (12 to 17, 20, 21 in FIG. 6, 22 in FIG. 8) for functioning as a transport robot in the frame 11 (see FIG. 5).

The frame 11 is a structure body for implementing various components (12 to 17, 20, 21 in FIG. 6) for functioning as a transport robot (see FIG. 5). The frame 11 can be, for example, a housing structure, a box-shaped structure, or the like. A pair of wheels 20 and 21 are rotatably attached to both sides of the frame 11. A caster 22 is attached to a bottom surface of the frame 11.

The drive parts 12 and 13 are function parts that drive the wheels 20 and 21 (see FIG. 6). As the drive parts 12 and 13, for example, a drive unit including a motor, a speed reducer (or transmission), a driver, various sensors (current sensor, torque sensor, position sensor, etc.), a regulator, and the like can be used. The drive parts 12 and 13 are attached to the frame 11. A rotation power of the drive part 12 can be transmitted to the wheels 20 via a shaft 14. A rotation power of the drive part 13 can be transmitted to the wheels 21 via a shaft 15.

The shafts 14 and 15 are shaft members that transmit rotation powers of the corresponding drive parts 12 and 13 to the wheels 20 and 21 (see FIG. 6). The shaft 14 is connected to an output shaft (not shown) of the drive part 12 and extends to one outer side surface of the frame 11. The shaft 14 is attached to the shaft of the wheel 20 outside the frame 11. The shaft 15 is connected to an output shaft (not shown) of the drive part 13 and extends to another side surface outside the frame 11. The shaft 15 is attached to the shaft of the wheel 21 outside the frame 11. The shafts 14 and 15 are arranged so as to be coaxial with each other on the imagination line (axle 81) shown by one short dash line in FIG. 9 (see FIG. 9). The shafts 14 and 15 may be arranged so as to allow the wheels 20 and 21 to tilt (so as to have a camber angle), and may be designed so that tilts of the wheels 20 and 21 are changed by using a suspension, a constant velocity joint, or the like (so that the camber angle fluctuates).

The control part 16 is a function part that controls a pair of drive parts 12 and 13 by cooperating with another transport robot (see FIG. 6). As the control part 16, for example, a control unit including a memory, a processor, or the like can be used. In this case, the control part may be configured to perform control processing by executing a program in the processor while using the memory. The control part 16 can adjust movement speed and movement direction of the transport robot 2 by controlling the drive parts 12 and 13. The control part 16 itself is attached to the frame 11. The control part 16 can be communicatably connected to another transport robot or control apparatus (3 in FIG. 4) via the communication part 17. The control part 16 may be configured to autonomously control the transport robot on which the control part 16 is mounted and another transport robot.

The communication part 17 is a function part that enables communication with other transport robots (see FIG. 6). The communication part 17 may have a configuration capable of communicating with the control apparatus 3 of FIG. 4.

The wheels 20 and 21 are drive wheels that realize movement of the transport robot 2 (see FIGS. 5 to 9). The wheel 20 is fixed to the shaft 14 at an axial center of the wheel 20. The wheel 21 is fixed to the shaft 15 at the axial center of the wheel 21. The wheels 20 and 21 are arranged so as to be coaxial with each other on the axle 81 (see FIG. 9). The wheels 20 and 21 may be arranged so as to be tilted (so as to have a camber angle), and may be designed so that tilts are changed by using a suspension, a constant velocity joint, or the like (so that the camber angle fluctuates).

The caster 22 is a non-driving wheel that functions as an auxiliary wheel for the wheels 20 and 21 (see FIG. 8). The caster 22 is configured to be rotatable so that a traveling direction can be changed.

The contact part 30 is a portion that contacts the transported object 5 (see FIGS. 5, 7 to 9). The contact part 30 is fixed to one end of the arm 41 of the rotation mechanism 40. The arm 41 is rotatably supported by the main body 10 at the shaft part 42 provided near the other end of the arm 41. As a result, the contact part 30 can rotate together with the arm 41 of the rotation mechanism 40 around the shaft part 42 extending in a direction perpendicular to the paper surface of FIG. 9, as shown by arrows A and A' shown in FIG. 9. The rotation direction of the contact part 30 may include at least a longitude direction (for example, in horizontal (planar) directions and a left-and-right direction) to the main body 10 and may include a latitude direction (for example, a vertical direction and a up and down-ward directions). The contact part 30 comprises a plate member 31. The plate member 31 comprises a friction part 33 on a surface that contacts the transported object 5. The plate member 31 is fixed to the arm 41 of the rotation mechanism 40. The friction part 33 increases friction force generated between the friction part 33 and the transported object when the friction part 33 contacts the transported object (see FIG. 5). As a result, the friction part 33 prevents or suppresses the relative slippage of the transported object in a state of contacting the friction part 33. As the friction part 33, a material having a high coefficient of friction and an elastic material (for example, rubber) having a restoring force can be used. The contact part 30 becomes a portion that presses the transported object 5 when the transport robot 2 is arranged on the rear side in the traveling direction of the transported object 5 during transporting, and becomes a portion that receives the transported object 5 when the transport robot 2 is also arranged on the front side. Although the contact part 30 is smaller than a width of the transported object 5 in FIGS. 7 and 8, the contact part 30 may be larger than the width.

The rotation mechanism 40 is a mechanism that makes the contact part 30 rotatable relative to the main body 10 (see FIGS. 5, 7 to 9). The rotation mechanism 40 comprises a shaft part 42 attached to an upper surface of the frame 11 of the main body 10. From the viewpoint of improving efficiency of drive control, a central axis of the shaft part 42 is preferably designed so as to pass through a midpoint of a width W between the wheels 20 and 21 on the axle 81 (see FIG. 9), but not limited to the design. The rotation mechanism 40 comprises an arm 41 rotatably attached to the shaft part 42 in horizontal direction. A plate member 31 of the contact part 30 is attached to the arm 41. The arm 41 is designed so that the contact part 30 does not interfere with the main body 10 or the wheels 20 and 21 when the contact part 30 is rotated. Although the number of arms 41 is one in FIG. 5, there may be a plurality of arms 41 at intervals. Although a rotatable angle of the rotation mechanism 40 is not particularly limited, the rotatable angle may be 45° to the left or right.

As the transported object 5 having a plurality of swivel casters 71 to 74 on the pedestal 70 on which the freight 6 is placed, a moving cart, a dolly, or the like can be used. The transported object 5 may be ones (for example, cardboard or the like) without wheels such as casters.

Figure 10:
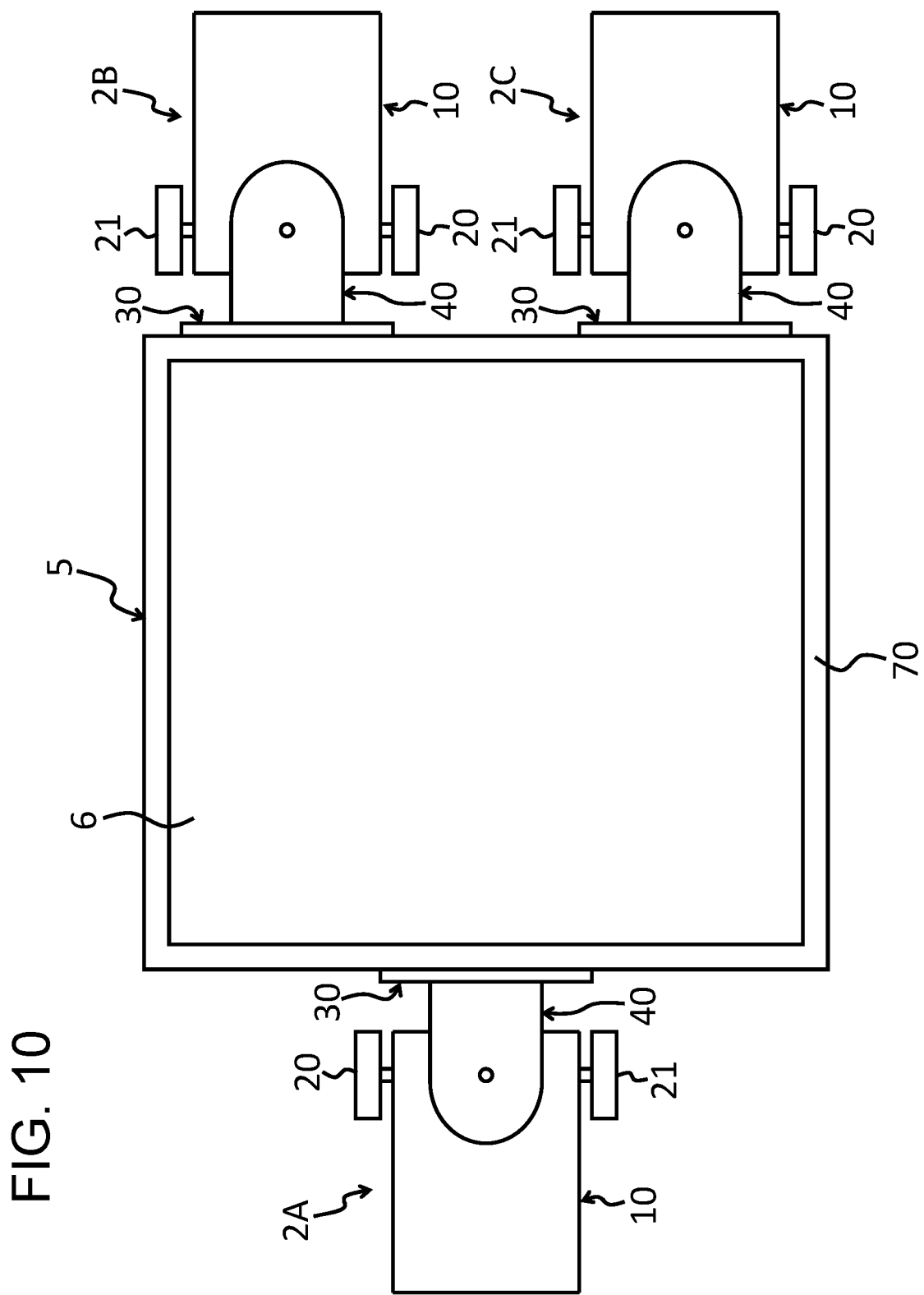
FIG. 10 is a plan view schematically showing a second example of a state in which the transport system according to the third exemplary embodiment is transporting a transported object.
Figure 11:
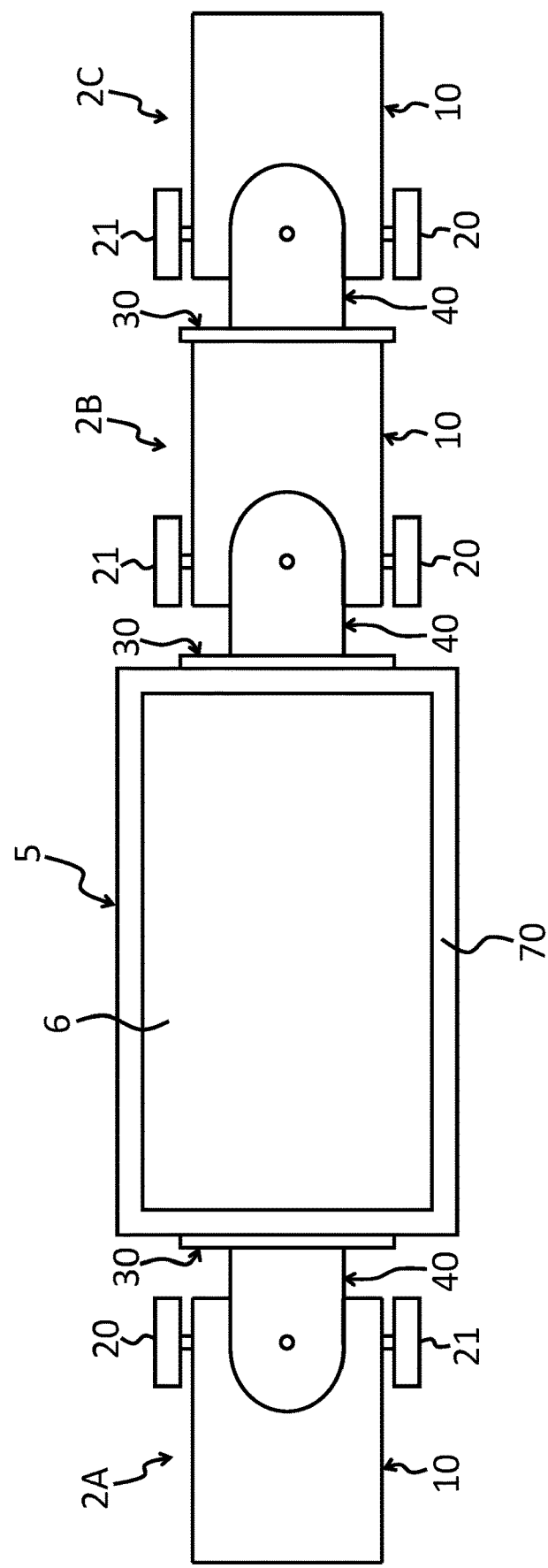
FIG. 11 is a plan view schematically showing a third example of a state in which the transport system according to the third exemplary embodiment is transporting a transported object.
Figure 12:
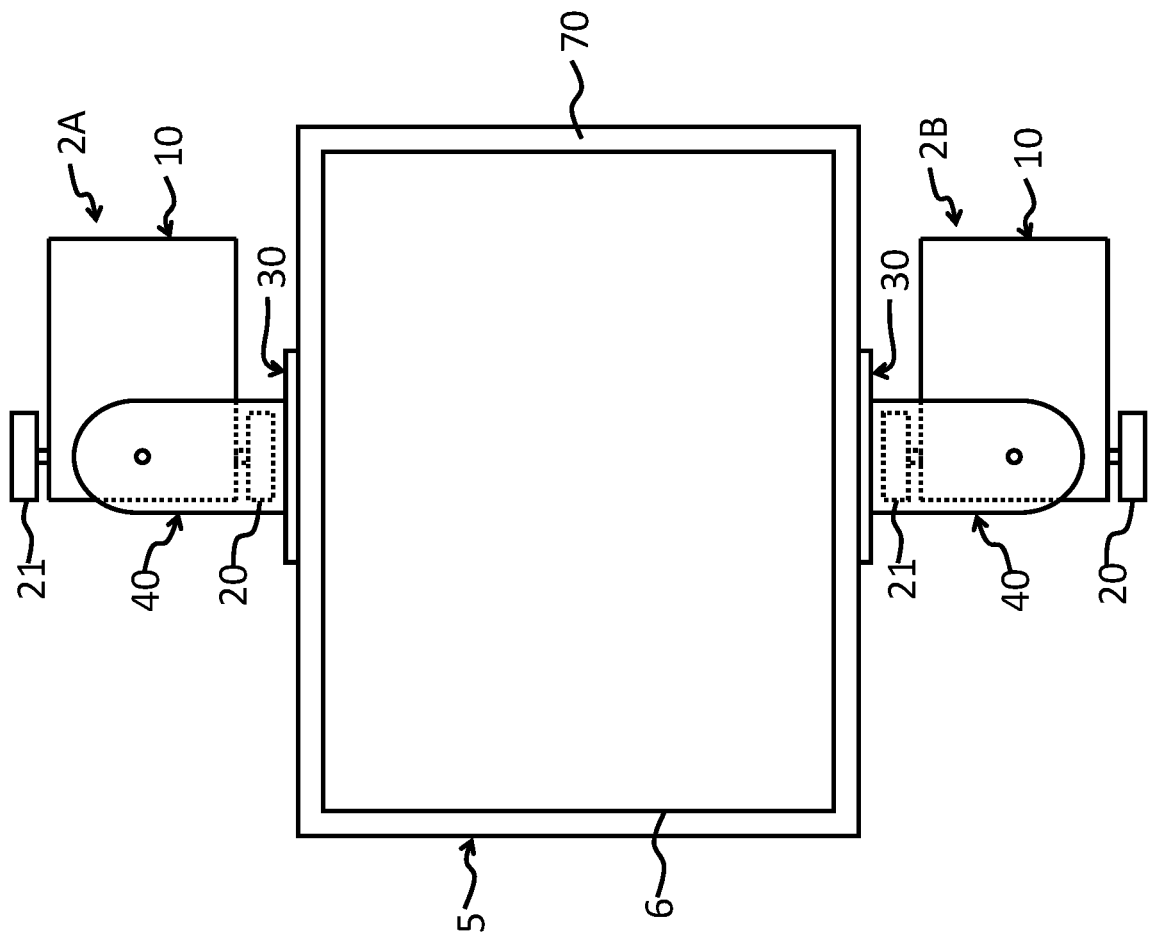
FIG. 12 is a plan view schematically showing a fourth example of a state in which the transport system according to the third exemplary embodiment is transporting a transported object.

When the transported object 5 is transported, the transport robot 2 as shown in FIG. 5 may not only transport the transported object 5 in a state that the two transport robots 2A and 2B sandwich the front and rear of the transported object 5 as shown in FIGS. 7 and 8, but also transport the transported object 5 in a state that three transport robots 2A, 2B, and 2C are arranged with one in front of the transported object 5 and two in parallel in the rear of the transported object 5 and sandwich the transported object 5 as shown in FIG. 10. Also, the transport robots 2 may transport the transported object 5 in a state that three transport robots 2A, 2B, and 2C are arranged with one in front of the transported object 5 and two in series in the rear of the transported object 5 and sandwich the transported object 5 as shown in FIG. 11. Further, the transport robots 2 may transport the transported object 5 in a state that the two transport robots 2A and 2B sandwich left and right sides of the transported object 5 as shown in FIG. 12. An arrangement of the plurality of transport robots 2 may be set according to size and weight of the transported object 5.

According to the third exemplary embodiment, similarly to the first and second exemplary embodiments, it is possible to contribute to transporting various types (or forms) of the transported object(s) 5 as it is without reloading (i.e. changing of loading) the freight(s) 6 and it is possible to contribute to adapting to changes in transport direction of the transported object 5.

FOURTH EXEMPLARY EMBODIMENT

Figure 13:
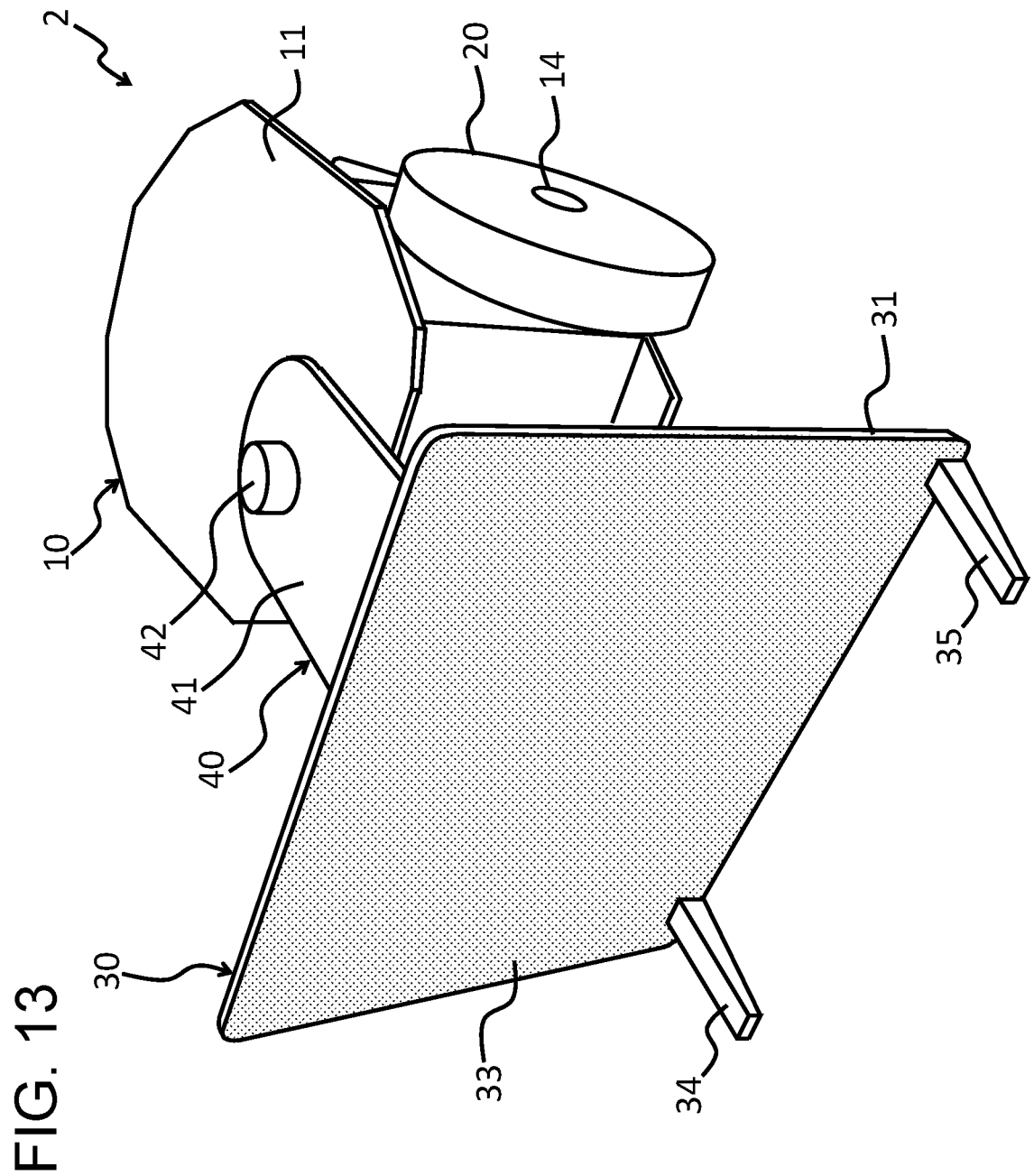
FIG. 13 is an external perspective view schematically showing a configuration of a transport robot in a transport system according to a fourth exemplary embodiment.
Figure 14:
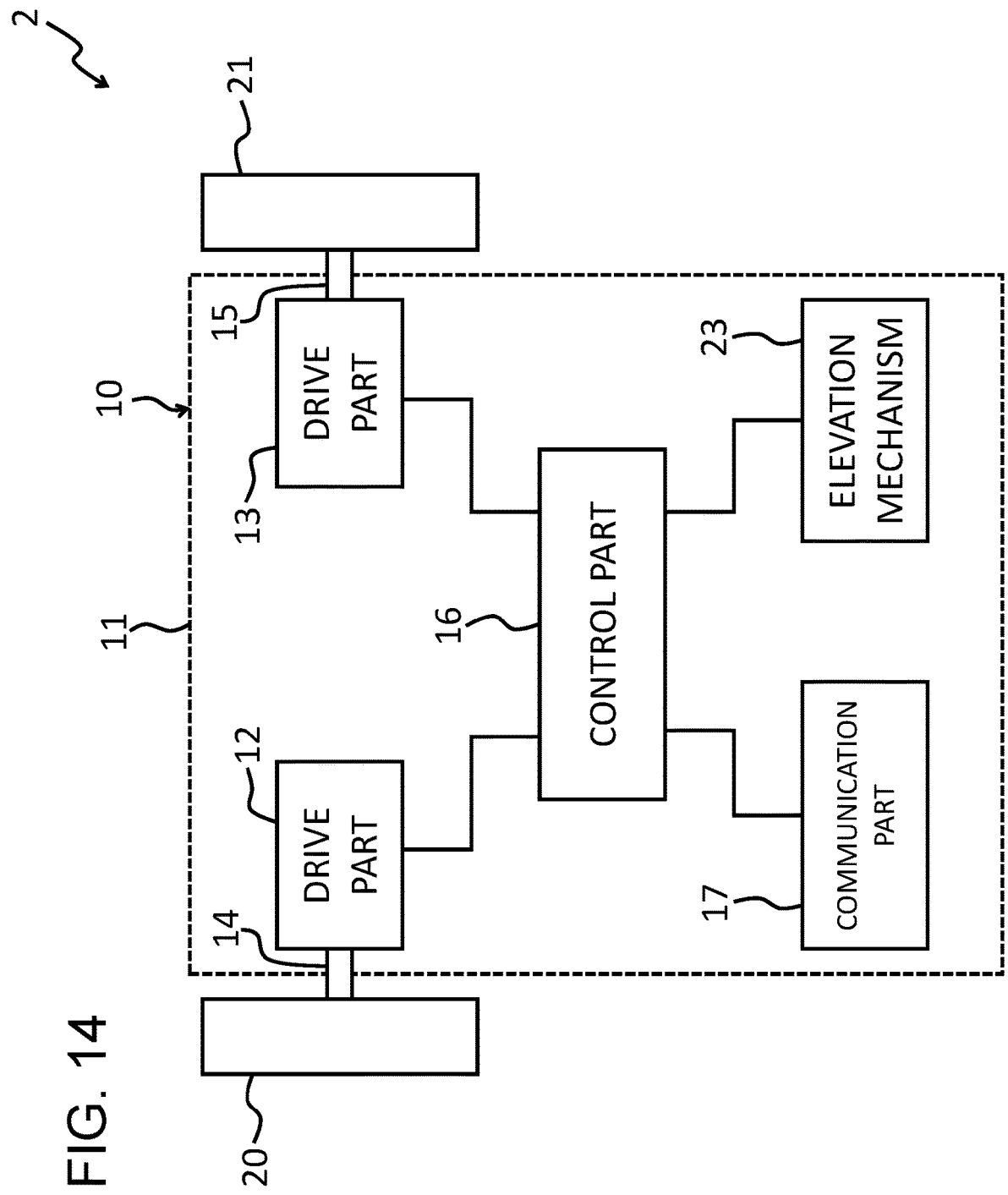
FIG. 14 is a block diagram schematically showing a circuit configuration of a main body of the transport robot in the transport system according to the fourth exemplary embodiment.

A transport system according to a fourth exemplary embodiment will be described with reference to the drawings. FIG. 13 is an external perspective view schematically showing a configuration of a transport robot in the transport system according to the fourth exemplary embodiment. FIG. 14 is a block diagram schematically showing a circuit configuration of a main body of the transport robot in the transport system according to the fourth exemplary embodiment.

The fourth exemplary embodiment is a modification of the third exemplary embodiment, in the transport robot 2, fork parts 34 and 35 are provided below a contact surface side of a plate member 31 of a contact part 30, and an elevation mechanism 23 making a contact part 30 lift and lower is provided.

The fork parts 34 and 35 are fork-shaped portions that enable a transported object (corresponding to 5 in FIGS. 7 and 8) to be lifted from the lower position (see FIG. 13).

The elevation mechanism 23 is a mechanism that enables the contact part 30 to be elevated (lifted and lowered) (see FIGS. 13 and 14). The elevation mechanism 23 may be configured to elevate the contact part 30 by making the rotation mechanism 40 elevating. The elevation mechanism 23 is controlled by a control part. As the elevation mechanism 23, for example, an electric elevator, a hydraulic elevator, or the like can be used.

Other configurations of the transport robot 2 are the same as those of the third exemplary embodiment.

According to the fourth exemplary embodiment, similarly to the third exemplary embodiment, it is possible to contribute to transporting various types (or forms) of transported object(s) as it is without reloading the freight(s), and it is possible to cope with the transported object(s) without wheels (for example, pallets).

FIFTH EXEMPLARY EMBODIMENT

Figure 15:
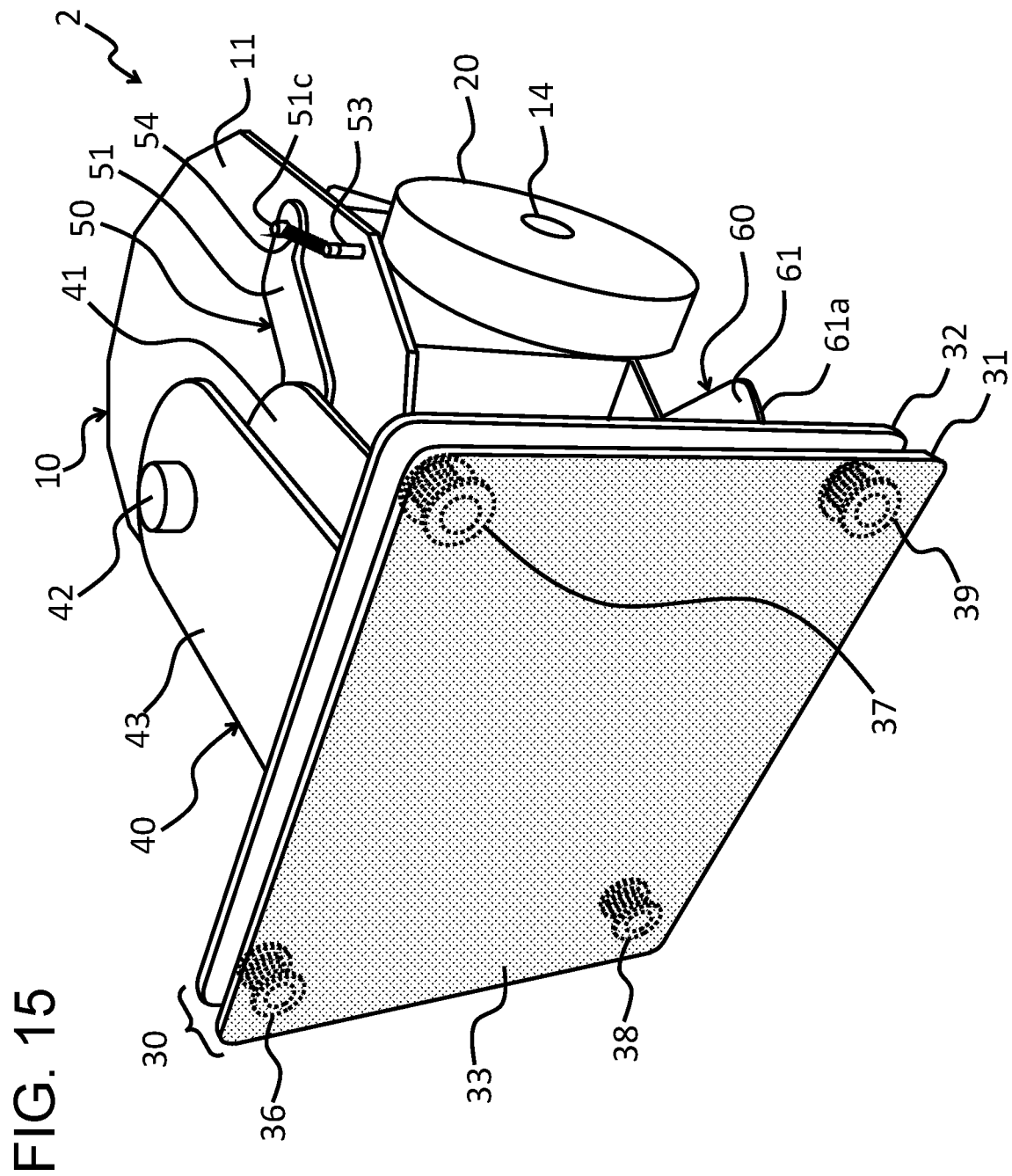
FIG. 15 is an external perspective view schematically showing a configuration of a transport robot in a transport system according to a fifth exemplary embodiment.
Figure 16:
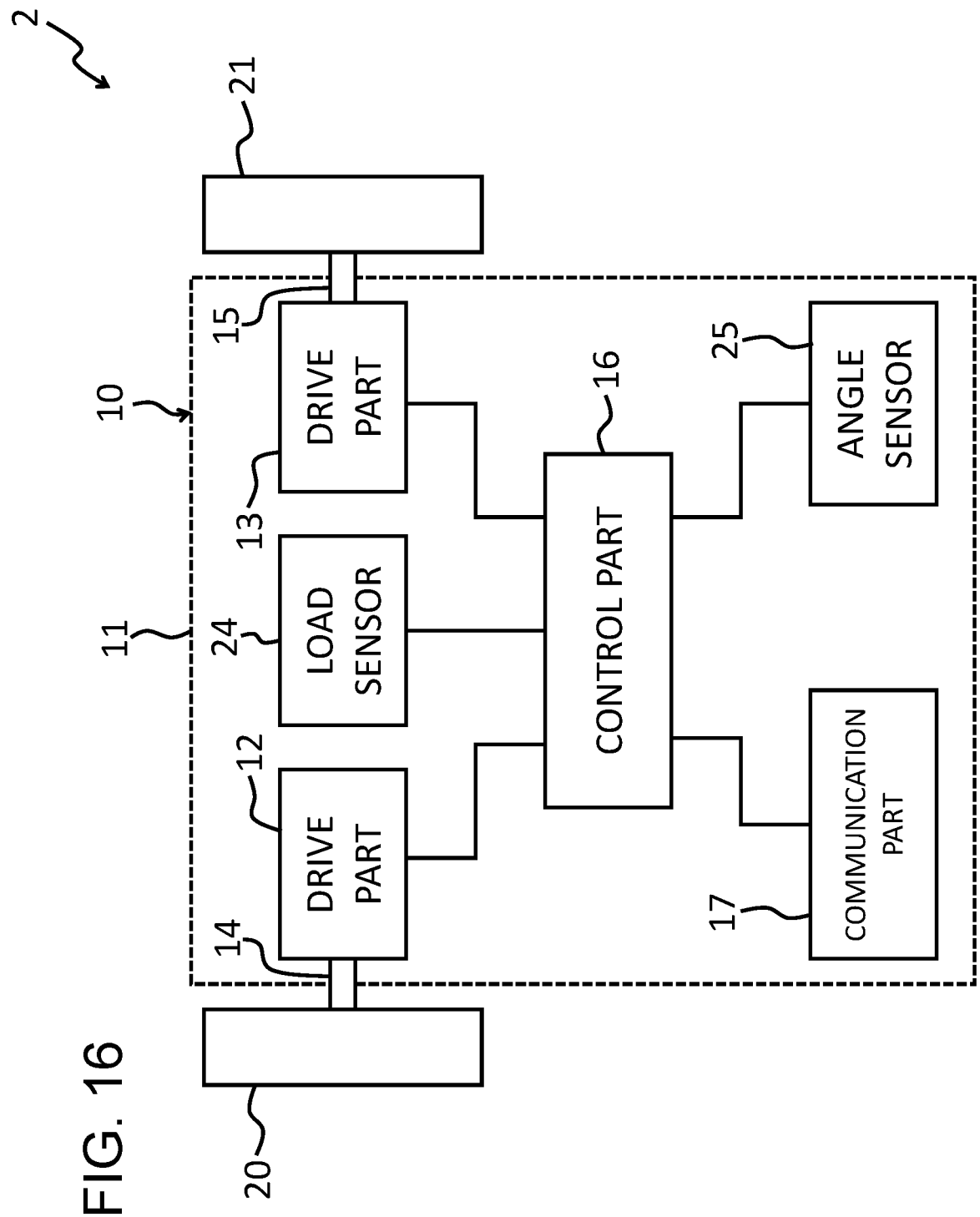
FIG. 16 is a block diagram schematically showing a circuit configuration of a main body of the transport robot in the transport system according to the fifth exemplary embodiment.
Figure 17:
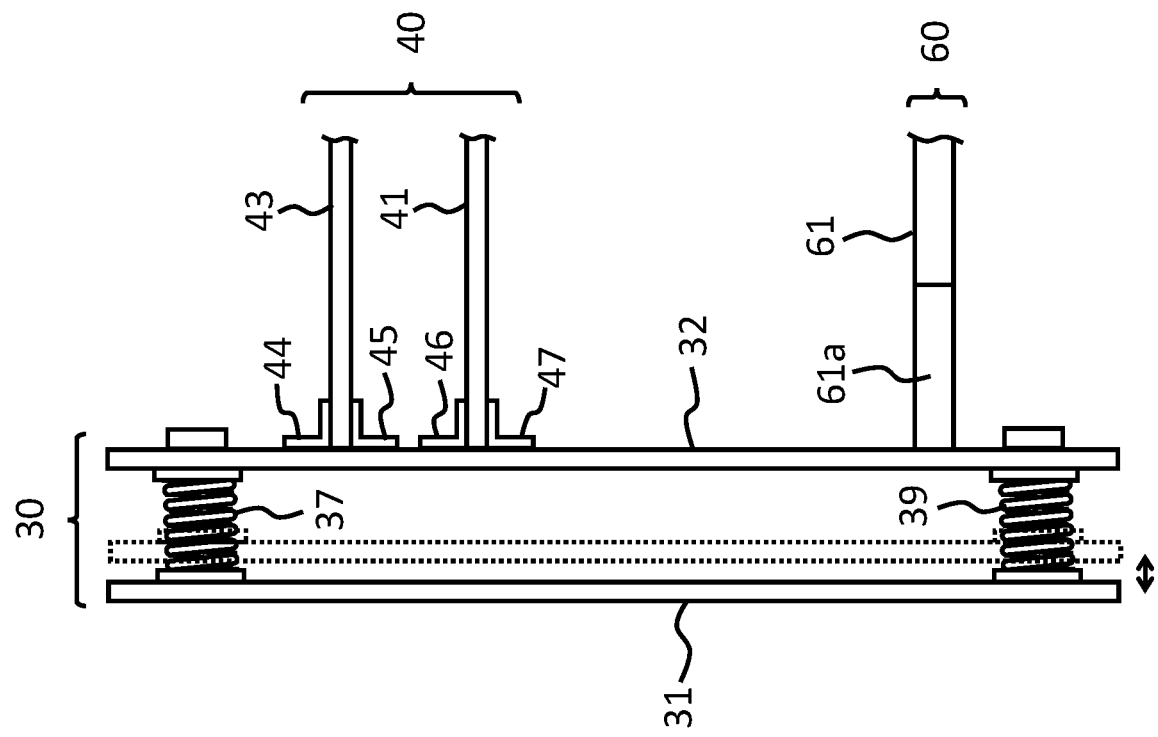
FIG. 17 is a partial left side view for explaining an operation of a contact part of the transport robot in the transport system according to the fifth exemplary embodiment.
Figure 18:
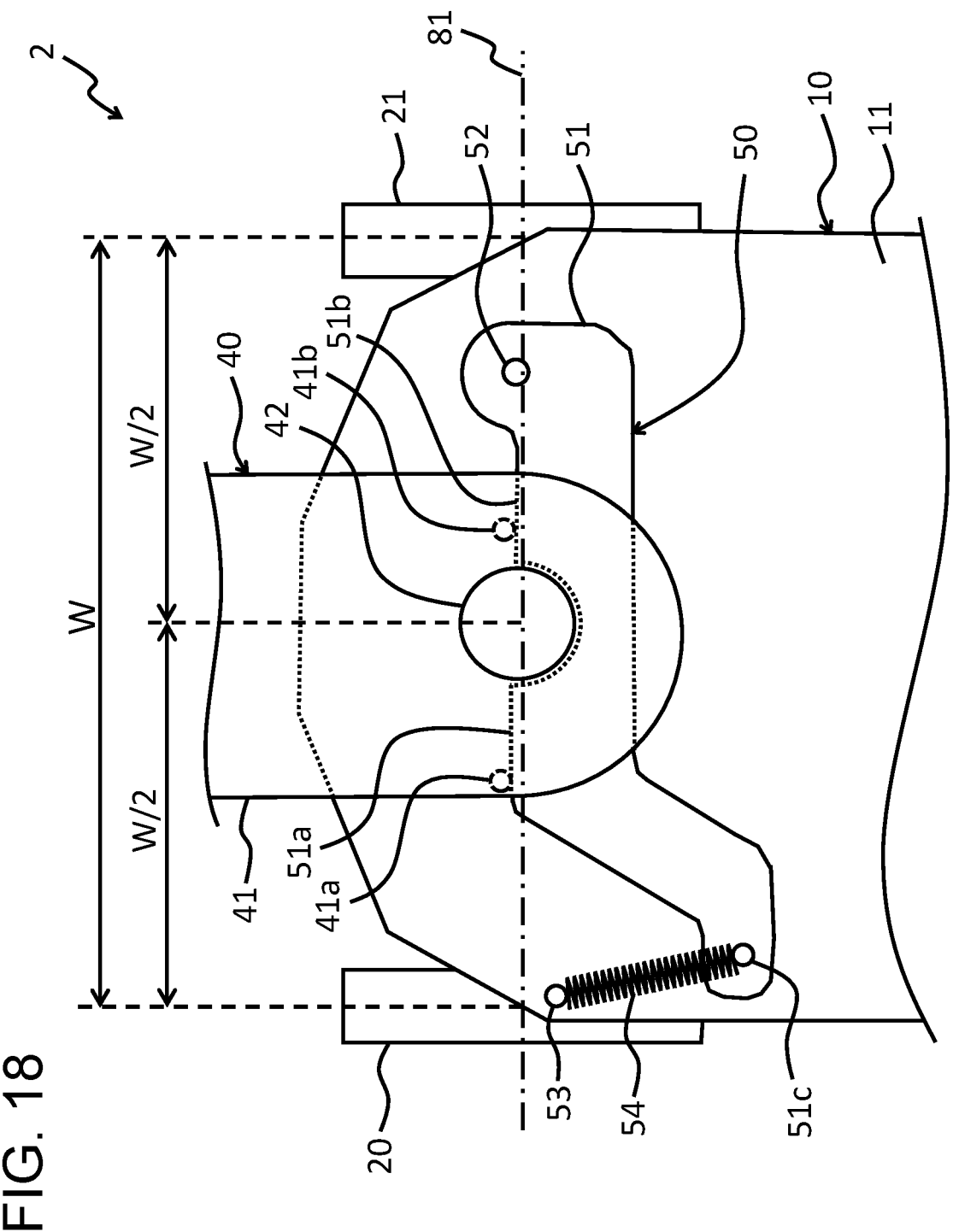
FIG. 18 is a schematic partial plan view for explaining an operation of a restoration mechanism of the transport robot in the transport system according to the fifth exemplary embodiment.
Figure 19:
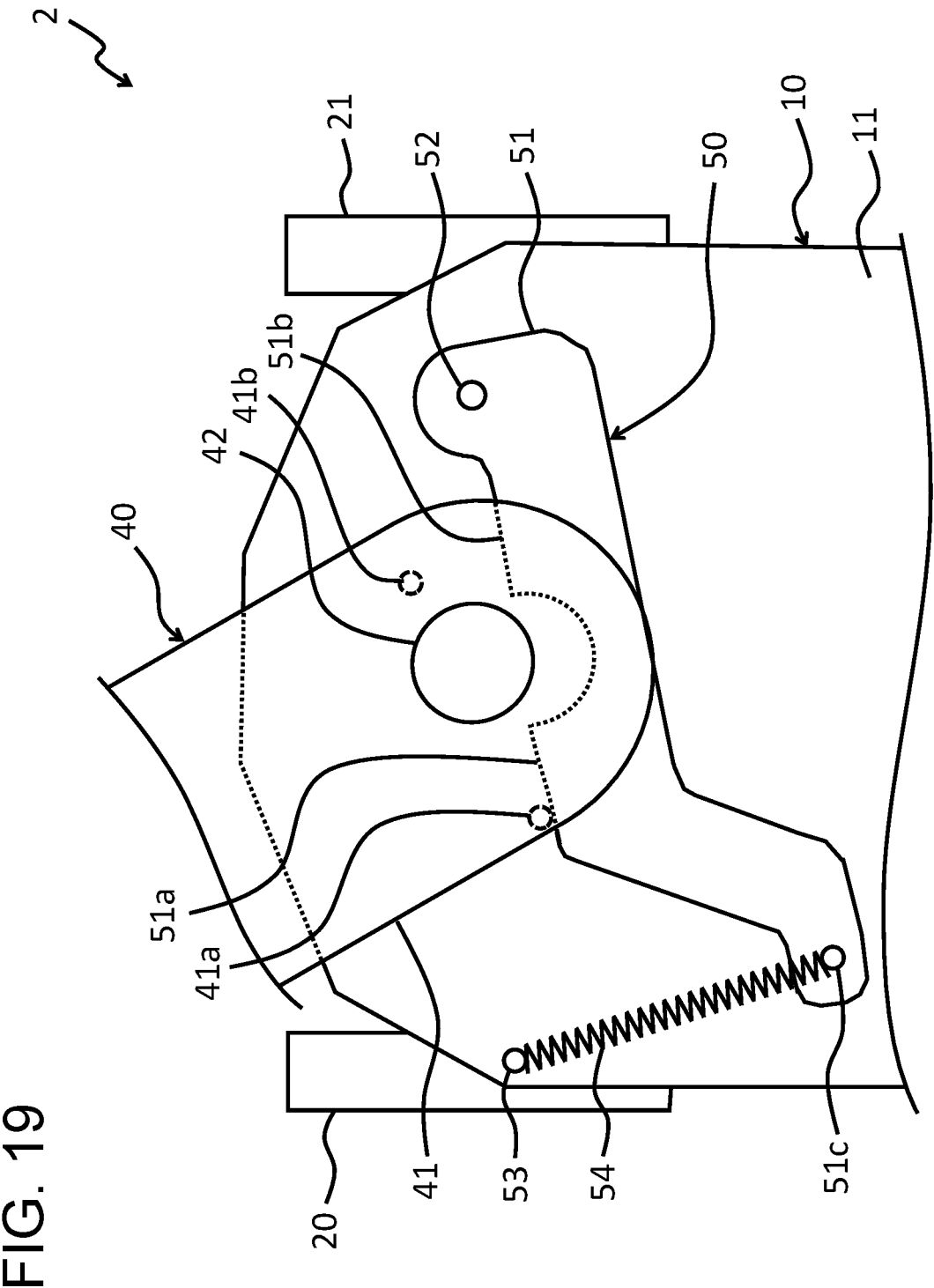
FIG. 19 is a schematic partial plan view when the contact part of the transport robot in the transport system according to the fifth exemplary embodiment is rotated in a first direction.
Figure 20:
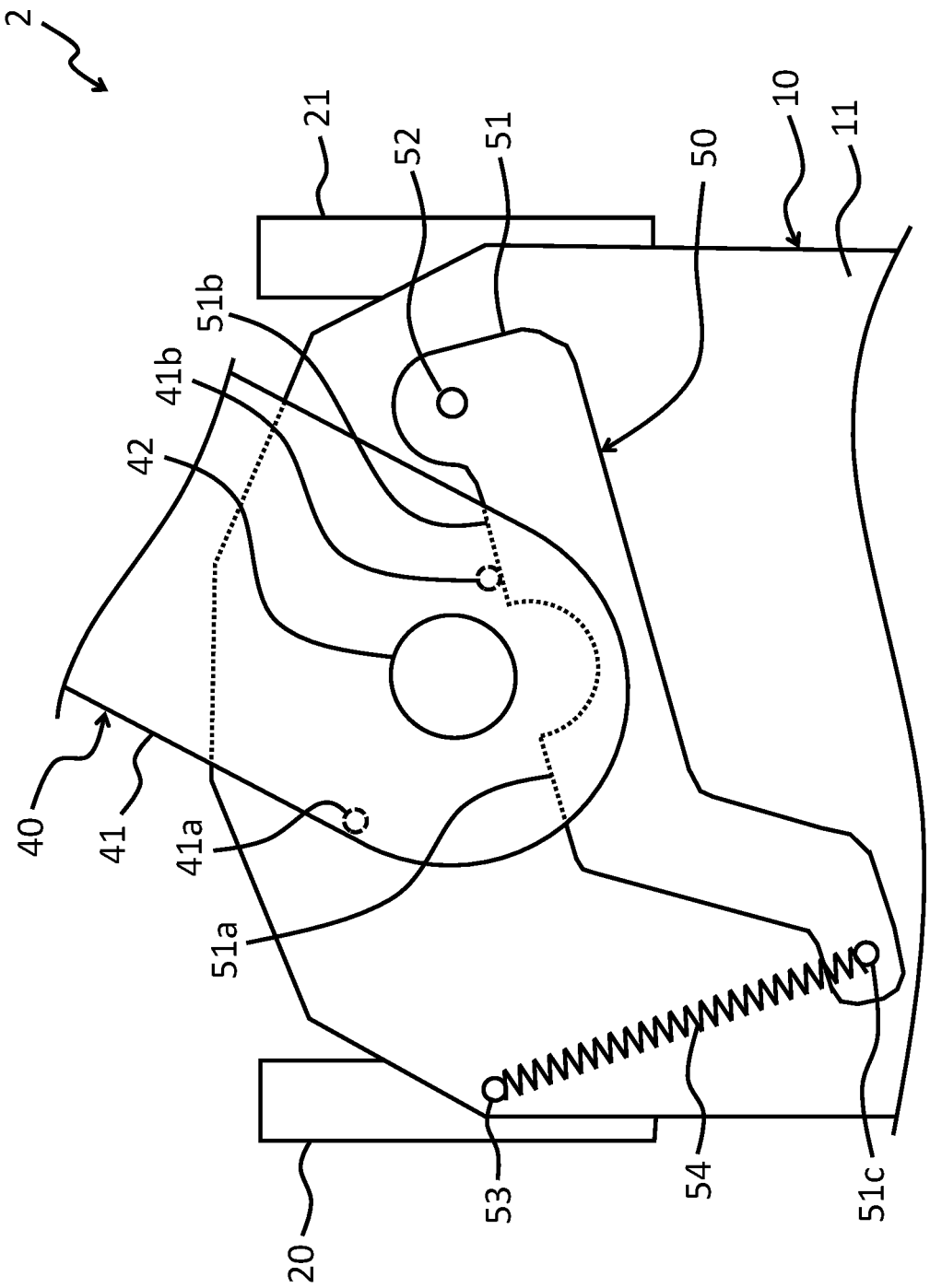
FIG. 20 is a schematic partial plan view when the contact part of the transport robot in the transport system according to the fifth exemplary embodiment is rotated in a second direction.
Figure 21:
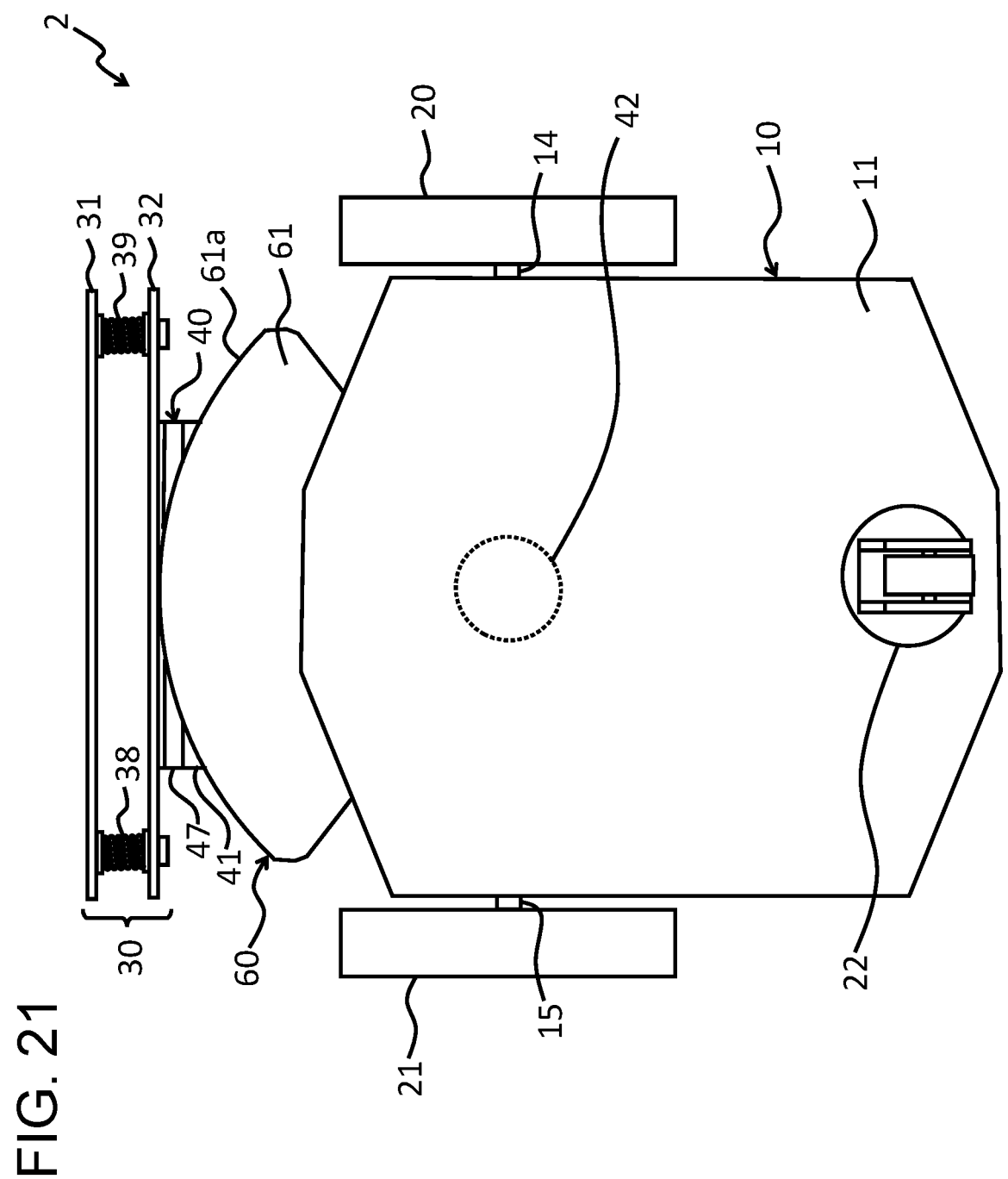
FIG. 21 is a schematic bottom view for explaining an operation of a guide mechanism of the transport robot in the transport system according to the fifth exemplary embodiment.
Figure 22:
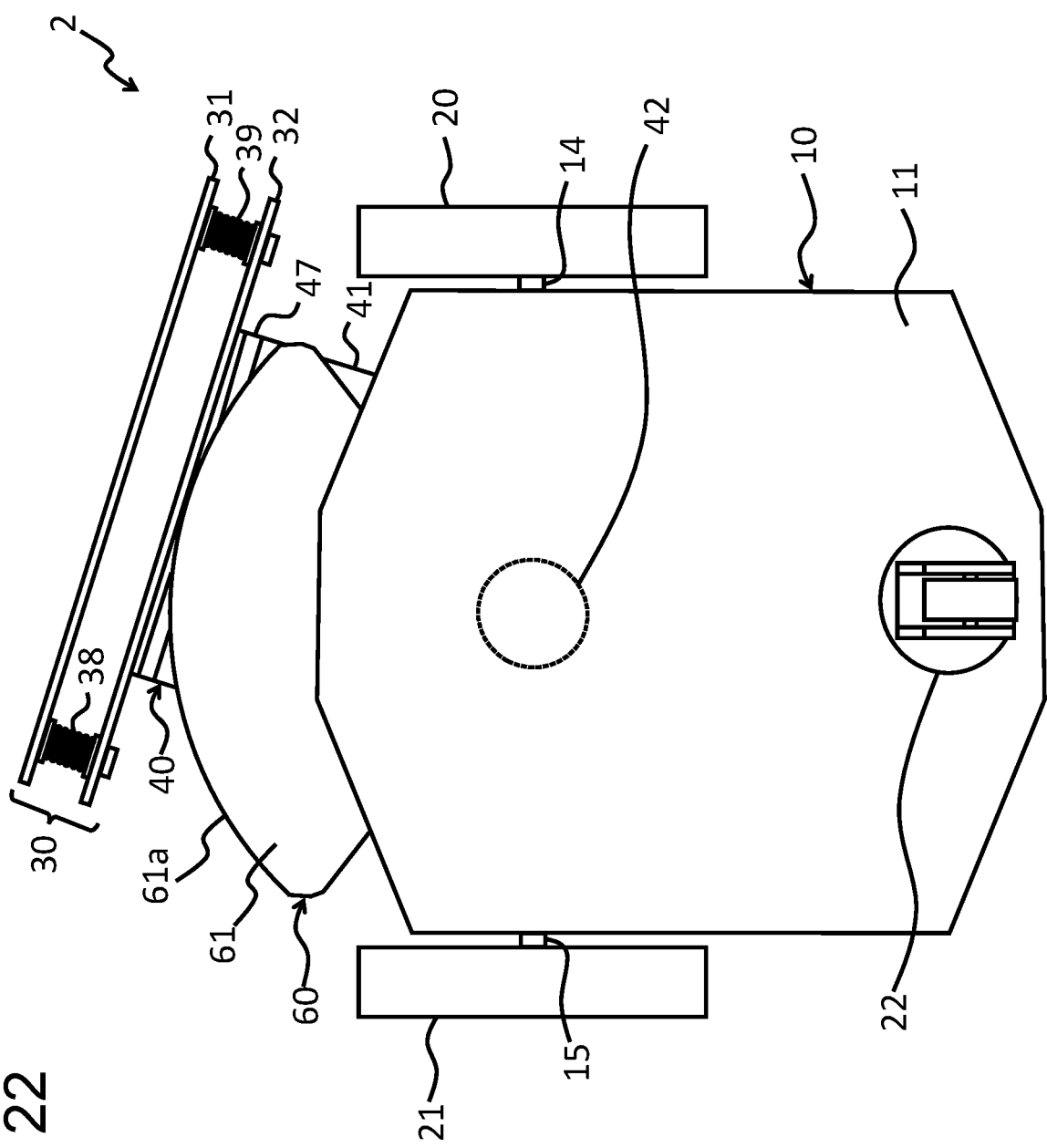
FIG. 22 is a schematic bottom view when the contact part of the transport robot in the transport system according to the fifth exemplary embodiment is rotated in the first direction.
Figure 23:
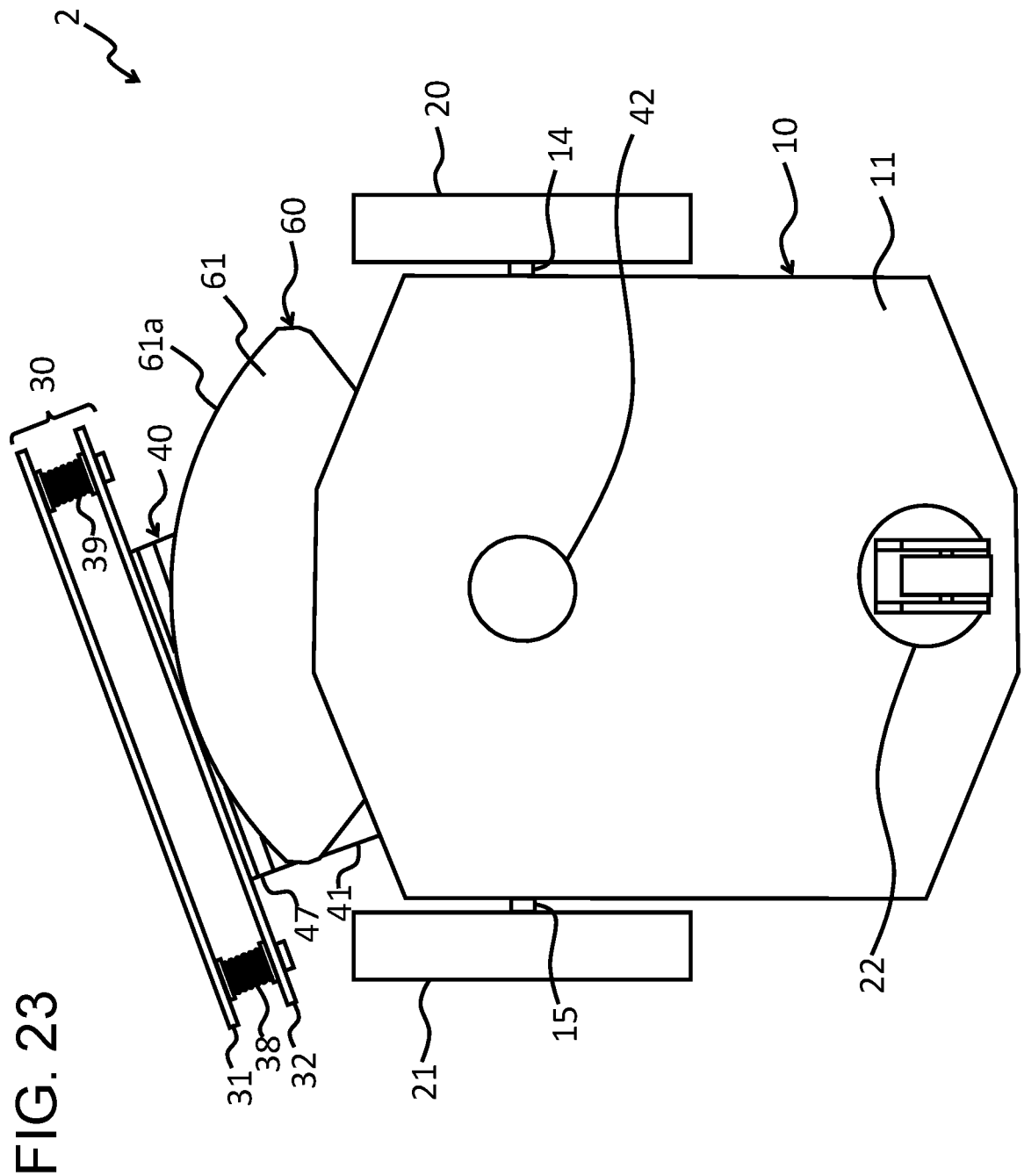
FIG. 23 is a schematic bottom view when the contact part of the transport robot in the transport system according to the fifth exemplary embodiment is rotated in the second direction.

A transport system according to a fifth exemplary embodiment will be described with reference to the drawings. FIG. 15 is an external perspective view schematically showing a configuration of a transport robot in the transport system according to the fifth exemplary embodiment. FIG. 16 is a block diagram schematically showing a circuit configuration of a main body of the transport robot in the transport system according to the fifth exemplary embodiment. FIG. 17 is a partial left side view for explaining an operation of a contact part of the transport robot in the transport system according to the fifth exemplary embodiment. FIG. 18 is a schematic partial plan view for explaining an operation of a restoration mechanism of the transport robot in the transport system according to the fifth exemplary embodiment. FIG. 19 is a schematic partial plan view when the contact part of the transport robot in the transport system according to the fifth exemplary embodiment is rotated in a first direction. FIG. 20 is a schematic partial plan view when the contact part of the transport robot in the transport system according to the fifth exemplary embodiment is rotated in a second direction. FIG. 21 is a schematic bottom view for explaining an operation of a guide mechanism of the transport robot in the transport system according to the fifth exemplary embodiment. FIG. 22 is a schematic bottom view when the contact part of the transport robot in the transport system according to the fifth exemplary embodiment is rotated in the first direction. FIG. 23 is a schematic bottom view when the contact part of the transport robot in the transport system according to the fifth exemplary embodiment is rotated in the second direction.

The fifth exemplary embodiment is a modification of the third exemplary embodiment, and the transport robot 2 is configured so that drive parts 12 and 13 can be feedback-controlled by modifying a contact part 30 so that the contact load between the contact part 30 and the transported object (corresponding to 5 in FIGS. 7 and 8) can be detected, and a restoration mechanism 50 and a guide mechanism 60 that assist an operation of the rotation mechanism 40 are provided (see FIGS. 15 and 16).

The contact part 30 is configured so that the load sensor 24 can detect contact load between the contact part 30 and the transported object (corresponding to 5 in FIGS. 7 and 8) (see FIGS. 15 to 17). The contact part 30 of FIG. 17 is configured so that the contact load when the contact part 30 and the transported object contact each other can be detected by detecting distance between the plate members 31 and 32. The contact part 30 comprises: plate members 31, 32; a friction part 33; and elastic members 36, 37, 38, 39.

The plate member 31 is supported by the plate member 32 via elastic members 36, 37, 38, 39 (see FIGS. 15 and 17). The plate member 31 comprises a friction part 33 on a surface that contacts the transported object 5. The friction part 33 is the same as the friction part of the third exemplary embodiment (33 in FIG. 5).

The plate member 32 supports the plate member 31 via elastic members 36, 37, 38, 39 (see FIGS. 15 and 17). The plate member 32 is attached to the arm 43 by stays 44 and 45, and is attached to the arm 41 by stays 46 and 47. The plate member 32 contacts slidably a guide surface 61a of the guide member 61 in the guide mechanism 60, and the guide mechanism 60 supports pressing of the contact part 30 against the transported object.

The elastic members 36, 37, 38, 39 are interposed between the plate members 31, 32 (see FIGS. 15 and 17). The elastic members 36, 37, 38, 39 act so as to return to an original uncompressed state when compressing and deforming by making a gap between the plate members 31 and 32 narrow (so that the gap between the plate members 31 and 32 is widened).

The rotation mechanism 40 is a mechanism that makes the contact part 30 rotatable relative to the main body 10 (see FIGS. 15 and 17 to 20). The rotation mechanism 40 comprises: a shaft part 42; and arms 41 and 43.

The shaft part 42 is fixed to the frame 11 of the main body 10. A central shaft of the shaft part 42 is preferably designed so as to pass through a midpoint of width W between the wheels 20 and 21 (see FIG. 18) but is not limited to this design. The arms 41 and 43 are attached to the shaft part 42 rotatably in horizontal direction.

The arms 41 and 43 are set so that the contact part 30 does not interfere with the main body 10 and the wheels 20 and 21 when the contact part 30 is rotated. A plate member 31 of the contact part 30 is attached to the arm 43 by stays 44 and 45. A plate member 31 of the contact part 30 is attached to the arm 41 by stays 46 and 47.

Pin parts 41a and 41b are fixed to the arm 41 at a position away from the shaft part 42. The pin parts 41a and 41b function as cams of the restoration mechanism 50. The pin parts 41a and 41b are arranged apart from each other. The pin part 41a contacts a receiving surface 51a of the swing member 51 in the restoring mechanism 50 so as to be able to contact/separate and slide. The pin part 41b contacts a receiving surface 51b of the swing member 51 in the restoration mechanism 50 so as to be able to contact/separate and slide.

The rotation mechanism 40 comprises a restoration mechanism 50 that restores so as to return the contact part 30 in a state (for example, a state of FIGS. 19 and 20) of being rotated from a predetermined position (for example, a center point in rotation direction: front surface, origin point, state of FIG. 18), to the predetermined position.

The restoration mechanism 50 is a mechanism that acts on the rotation mechanism 40 so as to restore the contact part 30 in a state of being rotated from a predetermined position to the predetermined position (see FIGS. 15 and 18 to 20). The restoration mechanism 50 comprises: a swing member 51; a shaft part 52; a pin part 53; and an elastic member 54.

The swing member 51 is a member that can swing (rotate) about a shaft part 52 fixed to the frame 11 of the main body 10. The swing member 51 comprises: receiving surfaces 51a and 51b; and a pin part 51c. The receiving surface 51a is a surface that contacts the pin part 41a of the arm 41 in the rotation mechanism 40 so as to be able to contact/separate and slide. The receiving surface 51b is a surface that contacts the pin part 41b of the arm 41 in the rotation mechanism 40 so as to be able to contact/separate and slide. The pin part 51c is fixed at a predetermined position of the swing member 51 away from the shaft part 52 so as not to interfere with the arm 41. The pin part 51c is connected to one end of the elastic member 54 and is set to be pulled toward the pin part 53 connected to the other end of the elastic member 54.

The shaft part 52 is fixed to the frame 11 of the main body 10 at a position away from the shaft part 42. The swing member 51 is swingably (rotatably) attached to the shaft part 52.

The pin part 53 is fixed to the frame 11 of the main body 10 at a position away from the shaft part 52 so as not to interfere with the arm 41. The pin part 53 is connected to the other end of the elastic member 54 and is set to pull the pin part 51c connected to one end of the elastic member 54.

The elastic member 54 is a member that acts to pull the pin part 51c of the swing member 51 to the pin part 53 by an elastic force when extended. The elastic member 54 is configured that a pin part 51c of the swing member 51 is attached to one end of the elastic member 54 and a pin part 53 is attached to the other end of the elastic member 54. As the elastic member 54, for example, a coil spring, a torsion spring, or the like can be used.

When changing from the state of FIG. 18 to the state of FIG. 19, that is, when the arm 41 of the rotation mechanism 40 rotates from a predetermined position (center position) to the left about the shaft part 42, the restoration mechanism 50 acts so that: the pin part 41a of the arm 41 presses the receiving surface 51a of the swing member 51 (and the pin part 41b moves away from the receiving surface 51b); the swing member 51 rotates about the shaft part 52 so that distance between the pin part 51c of the swing member 51 and the pin part 53 becomes large; the elastic member 54 between the pin parts 51c and 53 extends; and the arm 41 returns to the predetermined position (center position).

Also, when changing from the state of FIG. 18 to the state of FIG. 20, that is, when the arm 41 in the rotation mechanism 40 rotates from the predetermined position (center position) to the right about the shaft part 42, the restoration mechanism 50 acts so that: the pin part 41b of the arm 41 presses the receiving surface 51b of the swing member 51 (and the pin part 41a moves away from the receiving surface 51a); the swing member 51 rotates about the shaft part 52 so that a distance between the pin part 51c of the swing member 51 and the pin part 53 becomes large; the elastic member 54 between the pin parts 51c and 53 extends; and the arm 41 returns to the predetermined position (center position).

The rotation mechanism 40 may comprise an attenuation mechanism (not shown) that attenuates vibration generated by the elastic member 54 in the restoring mechanism 50. The attenuation mechanism can attenuate vibration generated by the elastic member 54 in the restoration mechanism 50 due to friction, viscosity, or hysteresis.

The guide mechanism 60 is a mechanism that guides rotation of the contact part 30 to the main body 10 (see FIGS. 15, 17, and 21 to 23). The guide mechanism 60 supports pressing of the contact part 30 to the transported object. The guide mechanism 60 comprises a guide member 61 attached to the frame 11 in the main body 10. The guide mechanism 60 comprises a guide surface 61a formed along a trajectory of the contact part 30 when the contact part 30 is rotated. The guide surface 61a slidably contacts the plate member 32 in the contact part 30.

The load sensor 24 is a sensor that detects load (pressure) applied to the contact part 30 when the contact part 30 and the transported object contact each other in a state that the transported object is sandwiched between the plurality of transport robots 2 (see FIGS. 15 and 16). The load sensor 24 can detect load applied to the contact part 30 based on the distance between the plate members 31 and 32 sandwiching the elastic members 36 to 39 in the contact part 30. The load sensor 24 is not limited to this, and as the load sensor 24, a piezoelectric element (piezo element), a strain gauge, or the like can also be used. Information according to load detected by the load sensor 24 can be used to control the pair of drive parts 12 and 13 in the control part 16 so that the load when the contact part 30 and the transported object contacts each other, falls within a predetermined numerical range.

The angle sensor 25 is a sensor that detects rotation angle of the contact part 30 relative to the main body 10 (see FIGS. 15 and 16). As the angle sensor 25, for example, a position encoder for angle measurement, a position angle sensor (magnetic type, resolver type, contact type) connected to a shaft part 42 being a rotating portion of the rotation mechanism 40 can be used. The information according to angle detected by the angle sensor 25 can be used to control the pair of drive parts 12 and 13 in the control part 16 so that angle of the contact part 30 to the main body becomes an angle set according to the traveling direction.

According to the fifth exemplary embodiment, similarly to the third exemplary embodiment, it is possible to contribute to transporting various types (or forms) of a transported object(s) as it is without reloading the freight(s), and it is possible to correct misalignment of traveling direction and traveling speed of the transport robot 2.

SIXTH EXEMPLARY EMBODIMENT

Figure 24:
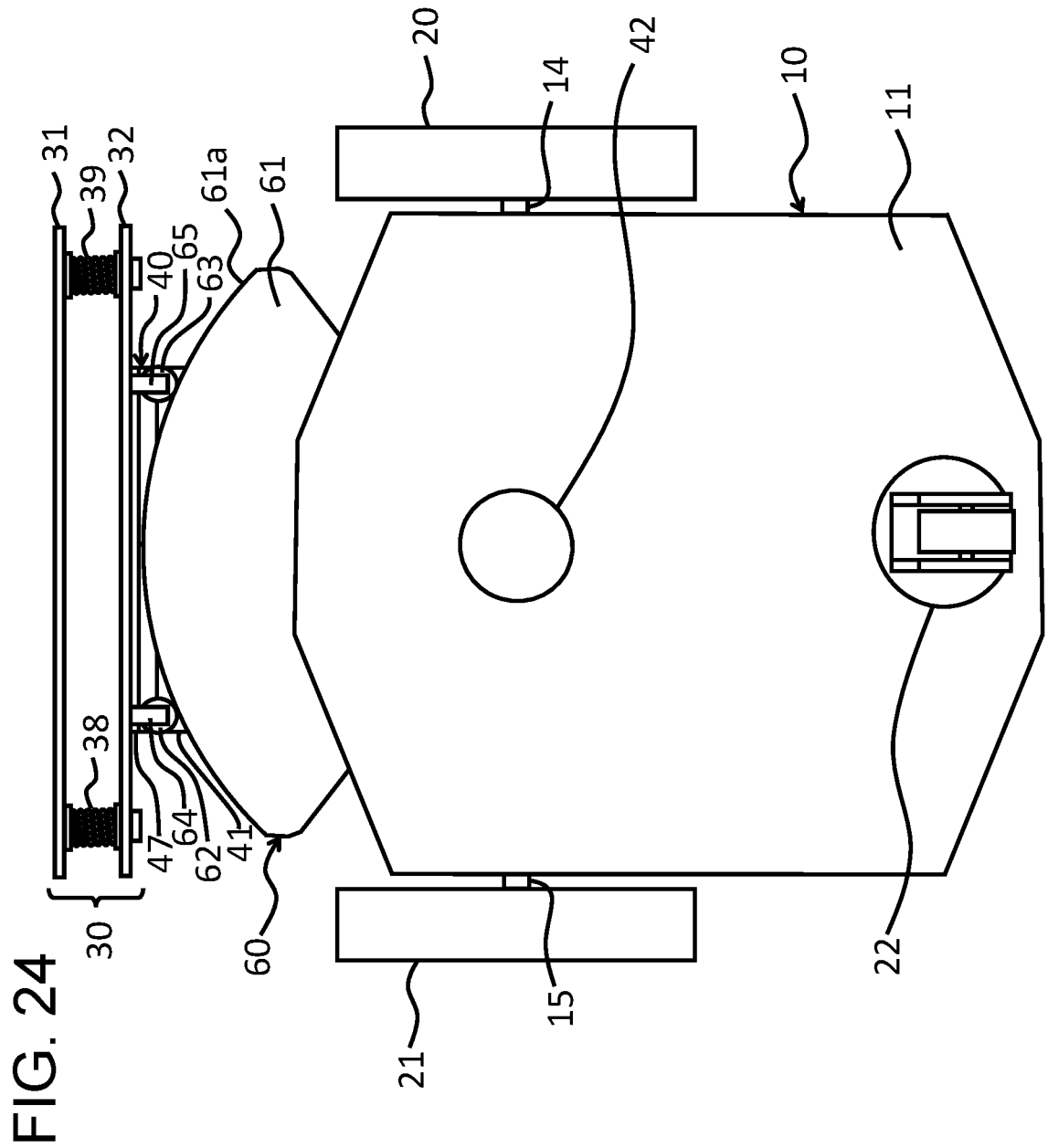
FIG. 24 is a schematic bottom view for explaining an operation of a guide mechanism of a transport robot in a transport system according to a sixth exemplary embodiment.

A transport system according to a sixth exemplary embodiment will be described with reference to the drawings. FIG. 24 is a schematic bottom view for explaining an operation of a guide mechanism of a transport robot in the transport system according to the sixth exemplary embodiment.

The sixth exemplary embodiment is a modification of the fifth exemplary embodiment, in the sixth exemplary embodiment, the plate member 32 of the contact part 30 is stopped from sliding on the guide surface 61a of the guide member 61 in the guide mechanism 60, and as a configuration part of the guide mechanism 60, rollers 62 and 63 are provided on the plate member 32 of the contact part 30. The roller 62 is rotatably attached to a support part 64 fixed to the plate member 32. Similarly, the roller 63 is rotatably attached to the support part 65 fixed to the plate member 32. The rollers 62 and 63 rotate along the guide surface 61a of the guide member 61. The other configurations are the same as those in the fifth exemplary embodiment.

According to the sixth exemplary embodiment, similarly to the fifth exemplary embodiment, it is possible to contribute to transporting various types (or forms) of transported object(s) as it is without reloading the freight(s), and it is possible to perform smoothly a rotation guide of the contact part 30 to the main body 10 by the rollers 62 and 63.

SEVENTH EXEMPLARY EMBODIMENT

Figure 25:
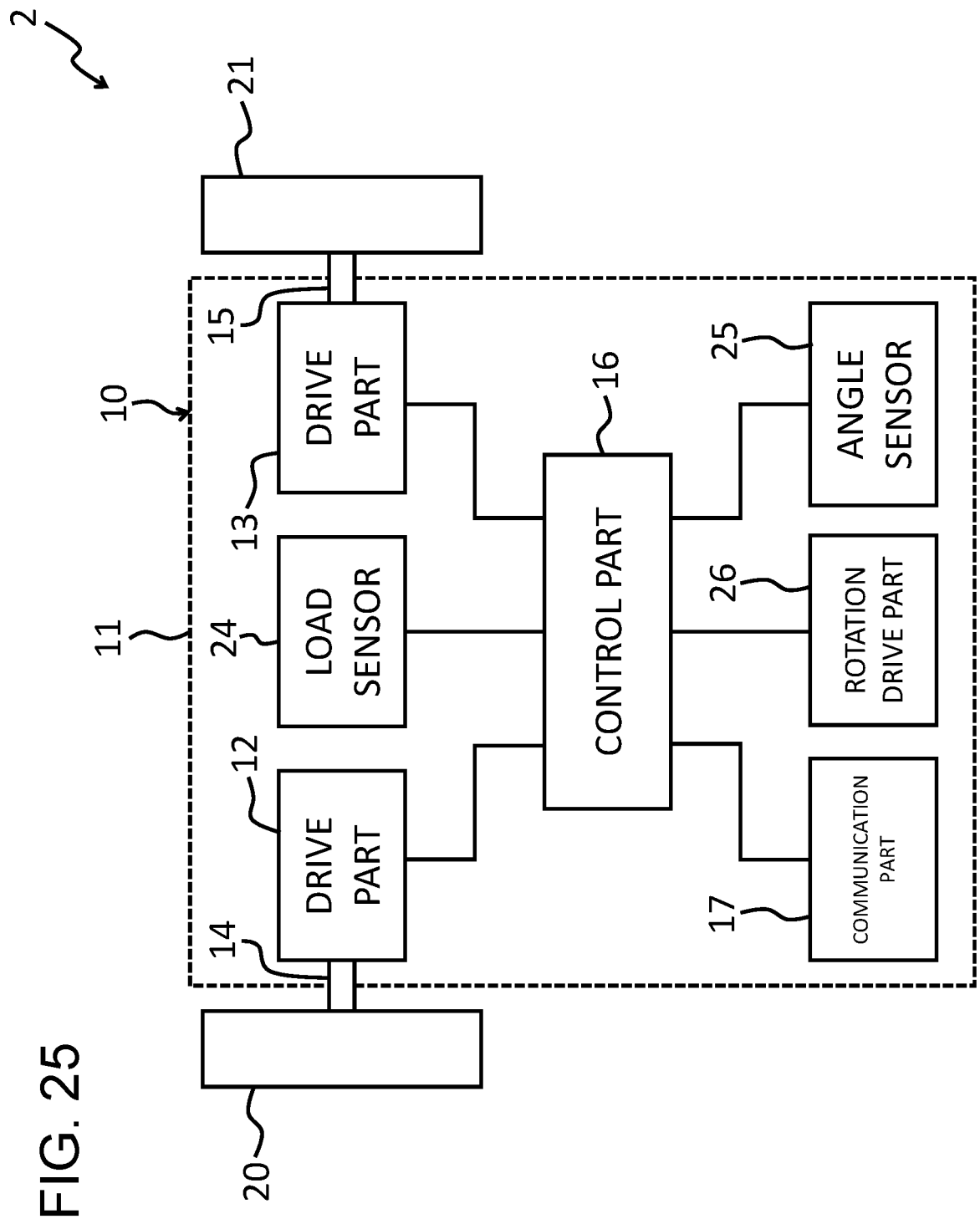
FIG. 25 is a block diagram schematically showing a circuit configuration of a main body of a transport robot in a transport system according to a seventh exemplary embodiment.

A transport system according to a seventh exemplary embodiment will be described with reference to the drawings. FIG. 25 is a block diagram schematically showing a circuit configuration of a main body of a transport robot in the transport system according to the seventh exemplary embodiment.

The seventh exemplary embodiment is a modification of the fifth exemplary embodiment and in the seventh exemplary embodiment, a rotation driving part 26 that drives horizontal rotation of the contact part 30 to the main body 10 is provided. The control part 16 controls the rotation drive part 26 so that an angle of the contact part 30 to the main body 10 becomes an angle set according to a traveling direction based on an angle detected by the angle sensor 25. The other configurations are the same as those in the fifth exemplary embodiment.

According to the seventh exemplary embodiment, similarly to the fifth exemplary embodiment, it is possible to contribute to transporting various types (or forms) of transported object(s) as it is without reloading the freight(s), and it is possible to correct deviation of traveling direction of the transport robot 2.

EIGHTH EXEMPLARY EMBODIMENT

Figure 26:
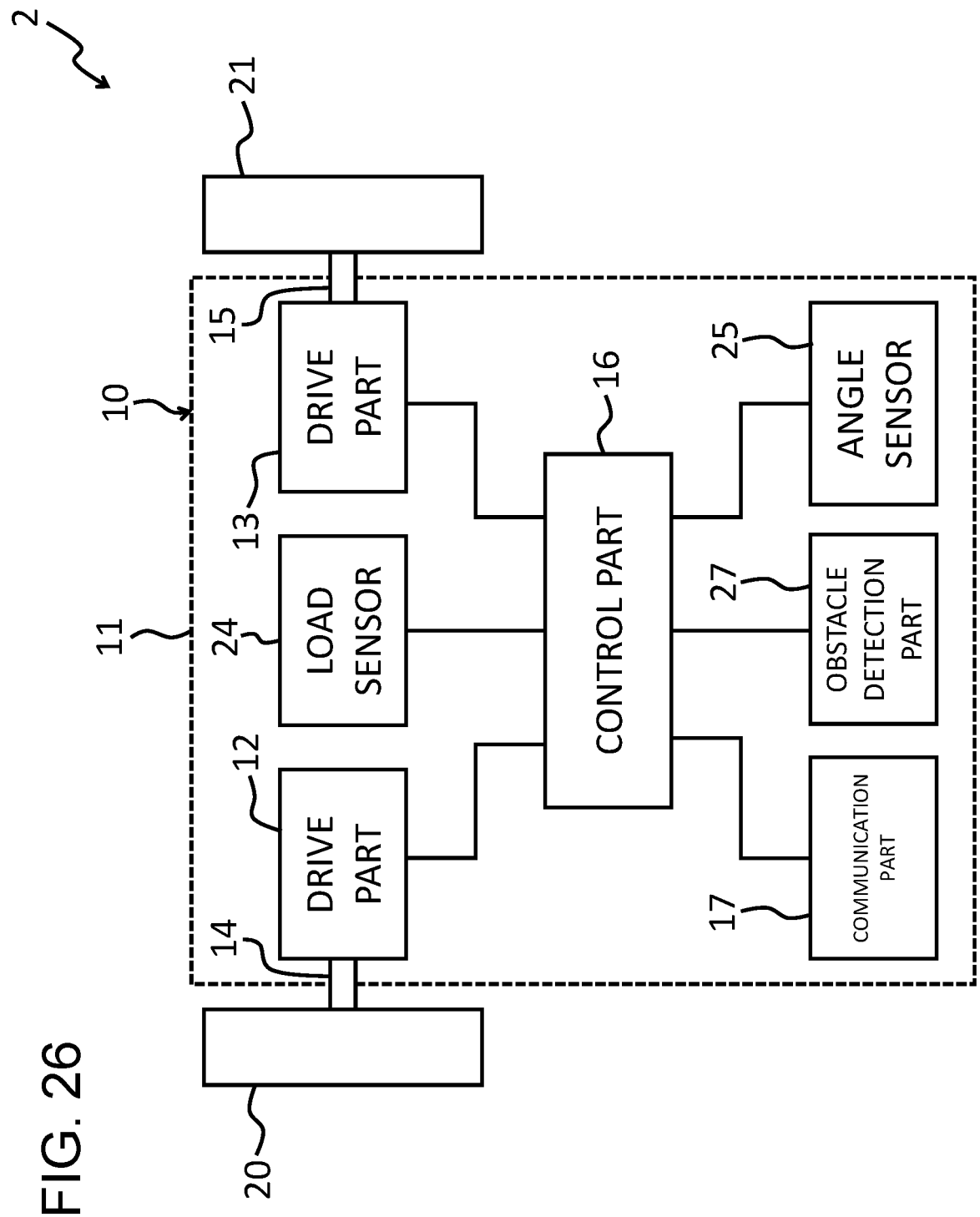
FIG. 26 is a block diagram schematically showing a circuit configuration of a main body of a transport robot in a transport system according to an eighth exemplary embodiment.

A transport system according to an eighth exemplary embodiment will be described with reference to the drawings. FIG. 26 is a block diagram schematically showing a circuit configuration of a main body of a transport robot in the transport system according to the eighth exemplary embodiment.

The eighth exemplary embodiment is a modification of the fifth exemplary embodiment, in the eighth exemplary embodiment, an obstacle detection part 27 that detects an obstacle around the transport robot 2 is added. As the obstacle detection part 27, for example, a laser radar, a beam sensor, a camera, or the like can be used. When the obstacle detection part 27 detects an obstacle(s), the control part 16 controls the drive parts 12 and 13 so as to avoid the obstacle(s). The other configurations are the same as those in the fifth exemplary embodiment.

According to the eighth exemplary embodiment, similarly to the fifth exemplary embodiment, it is possible to contribute to transporting various types (or forms) of transported object(s) as it is without reloading the freight(s), and it is possible to avoid an obstacle(s) appearing around the transport robot 2.

NINTH EXEMPLARY EMBODIMENT

Figure 27:
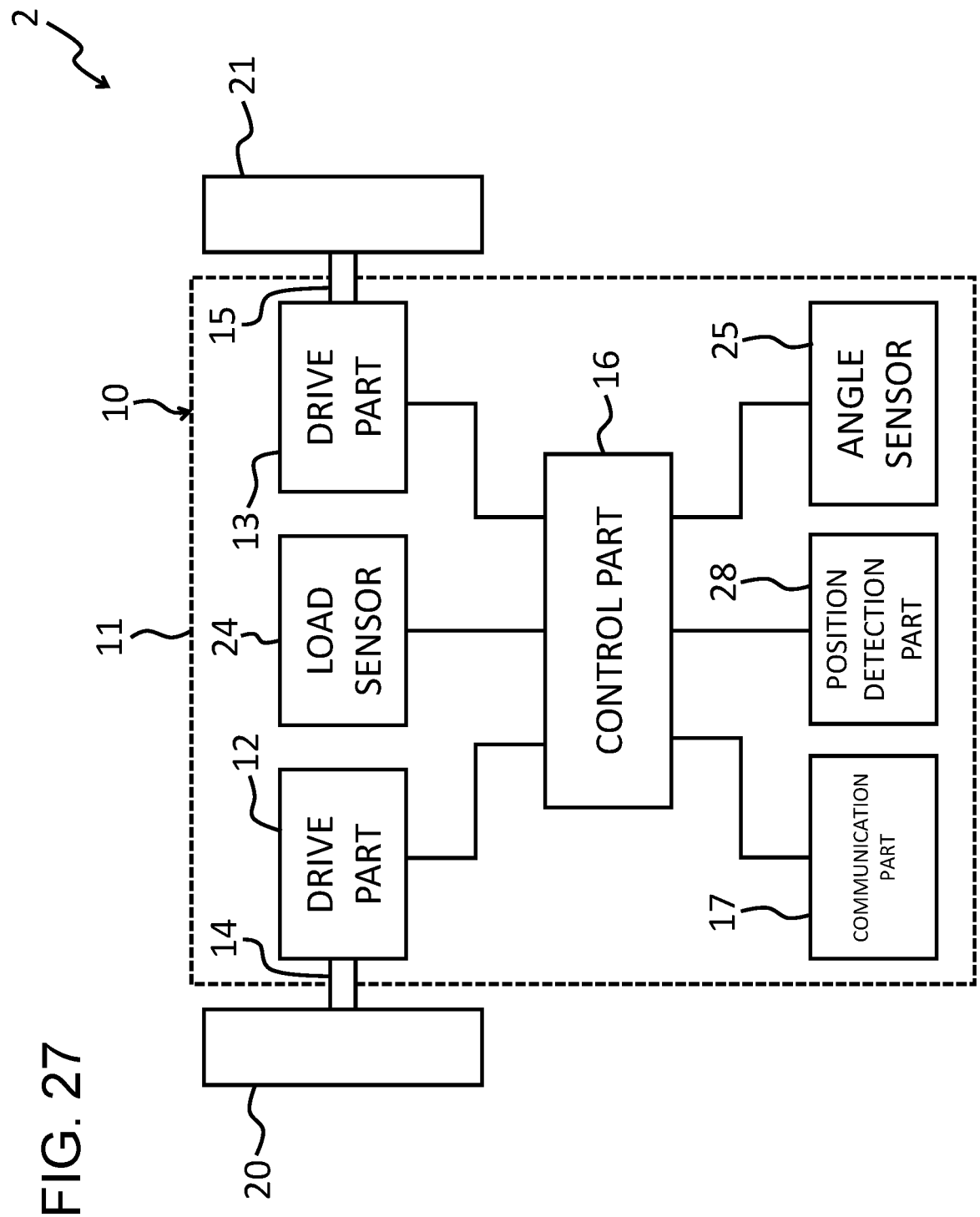
FIG. 27 is a block diagram schematically showing a circuit configuration of a main body of a transport robot in a transport system according to a ninth exemplary embodiment.

A transport system according to a ninth exemplary embodiment will be described with reference to the drawings. FIG. 27 is a block diagram schematically showing a circuit configuration of a main body of a transport robot in the transport system according to the ninth exemplary embodiment.

The ninth exemplary embodiment is a modification of the fifth exemplary embodiment, in the ninth exemplary embodiment, a position detection part 28 that detects a position of the transport robot 2 is added. As the position detection part 28, it is possible to use a means that measures its own position by signal from outside, for example: a GPS (Global Positioning System) receiver that measures its own position by receiving radio waves from artificial satellites configuring a GNSS (Global Navigation Satellite System); a beacon receiver that measures its own position by receiving a beacon radio wave from a beacon radio wave oscillator; or the like. The control part 16 controls the drive parts 12 and 13 based on a position detected by the position detection part 28.

According to the ninth exemplary embodiment, similarly to the fifth exemplary embodiment, it is possible to contribute to transporting various types (or forms) of transported object(s) as it is without reloading the freight(s), and since it is possible to transport while grasping a position of the transport robot 2 itself, it is possible to be transported by an accurate route.

Although part or all of the above exemplary embodiments can be described as the following modes, it is not limited to the following modes.

MODES

In the present invention, a mode of the transport robot according to the first aspect is possible.

In the transport robot according to the first aspect, the transported object is a moving cart comprising pivotable wheels on a pedestal on which a freight is placed.

In the transport robot according to the first aspect, the transport robot comprises: a main body; a contact part that contacts the transported object(s); and a rotation mechanism having an arm(s), the contact part being attached to one end of the arm(s), and the arm(s) being rotatably supported to the main body in the vicinity of the other end of the arm(s).

In the transport robot according to the first aspect, the rotation mechanism comprises a restoration mechanism that restores the contact part in a state of being rotated from a predetermined position so that the contact part is returned to the predetermined position.

In the transport robot according to the first aspect, the restoration mechanism comprises an elastic member.

In the transport robot according to the first aspect, the rotation mechanism comprises an attenuation mechanism that attenuates vibration of the restoration mechanism.

In the transport robot according to the first aspect, the attenuation mechanism attenuates vibration of the restoration mechanism by friction, viscosity, or hysteresis.

In the transport robot according to the first aspect, the transport robot comprises a pair of wheels rotatably attached to both sides of the main body; and the rotation mechanism makes the arm rotatable relative to the main body about an axis passing through a midpoint of width between the pair of wheels.

In the transport robot according to the first aspect, the contact part comprises a friction part to cause the friction force with the transported object to increase on a contact surface with the transported object.

In the transport robot according to the first aspect, the contact part comprises a fork part that enables the transported object to be lifted from below, and the transport robot comprises an elevation mechanism that enables the contact part to be elevated (lifted and lowered).

In the transport robot according to the first aspect, the transport robot comprises a guide mechanism that is attached to the main body; guides rotation of the contact part relative to the main body; and supports pressing of the contact part to the transported object.

In the transport robot according to the first aspect, the guide mechanism comprises a guide member attached to the main body and having a guide surface, and a roller(s) rotatably attached to the contact part and rotating on the guide surface.

In the transport robot according to the first aspect, the transport robot comprises: a pair of drive parts that is attached to the main body and drives the pair of wheels; a control part that controls the pair of drive parts; and a communication part, wherein the control part is connected communicatably with the other transport robot via the communication part, and controls the pair of drive parts by cooperating with the other transport robot.

In the transport robot according to the first aspect, the transport robot comprises a load sensor that detects a load when the contact part and the transported object contact each other, and the control part controls the pair of drive parts so that the load when the contact part and the transported object contact each other falls within a predetermined numerical range based on a detected load by the load sensor.

In the transport robot according to the first aspect, the contact part comprises: two plates; and an elastic member arranged between the two plates, and the load sensor detects the load when the contact part and the transported object contact each other by detecting distance between the two plates.

In the transport robot according to the first aspect, the load sensor is a piezoelectric sensor or a strain gauge.

In the transport robot according to the first aspect, the rotation mechanism comprises an angle sensor that detects rotation angle of the contact part relative to the main body; and the control part controls the pair of drive parts so that the rotation angle of the contact part relative to the main body becomes an angle set according to a traveling direction based on an angle detected by the angle sensor.

In the transport robot according to the first aspect, the angle sensor is a position encoder for angle measurement connected to a rotating portion of the rotation mechanism.

In the transport robot according to the first aspect, the transport robot comprises a rotation drive part that drives the horizontal rotation of the contact part relative to the main body, and the control part controls the rotation driving part so that the angle of the contact part relative to the main body becomes an angle set according to a traveling direction based on the angle detected by the angle sensor.

In the transport robot according to the first aspect, the transport robot comprises an obstacle detection part that detects an obstacle(s) around the transport robot, and the control part controls the pair of drive parts so as to avoid the obstacle(s) when detecting the obstacle(s) by the obstacle detection part.

In the transport robot according to the first aspect, the transport robot comprises a position detection part that detects a position of the transport robot, and the control part controls the pair of drive parts based on the position detected by the position detection part.

In the present invention, a mode of the transport system according to the second aspect is possible.

In the transport system according to the second aspect, the transport system is configured to transport the transported object in a state of sandwiching front and back or left and right of the transported object by cooperating with a plurality of transport robots when transporting the transported object.

In the transport system according to the second aspect, the transport system is configured to support the transported object by arranging at least two transport robots among the plurality of transport robots in parallel or in series on at least one of the front, rear, right, and left of the transported object.

In the transport system according to the second aspect, the plurality of transport robots are connected to each other so as to be able to communicate with each other, and at least one of the plurality of transport robots autonomously controls the plurality of transport robots.

In the transport system according to the second aspect, the transport system comprises a control apparatus that is communicatably connected to each of the plurality of transport robots and controls the plurality of transport robots.

In the present invention, a mode of the transport method according to the third aspect is possible.

It should be noted that the disclosures of each of the cited above PTLs are incorporated herein by reference. Modifications and adjustments of the exemplary embodiments or examples are possible within the framework of the entire disclosure (including the claims and drawings) of the present invention and based on the basic technical concepts thereof. Also, within the framework of the entire disclosure of the present invention, various combinations of various disclosed elements (including each element of each claim, each element of each exemplary embodiment or example, each element of each drawing, or the like), or selection (non-selection if necessary) is possible. That is, it goes without saying that the present invention includes various variations and modifications that can be made by one skilled in the art according to the entire disclosure including the claims and drawings, and the technical concepts. Further, with regard to numerical value and numerical range described here, any intermediate values, lower numerical value or small range should be interpreted as being concretely described even if not explicitly described.

REFERENCE SIGNS LIST

1 Transport system
2, 2A, 2B, 2C Transport robot
3 Control apparatus
5 Transported object
6 Freight
10 Main body
11 Frame
12, 13 Drive part
14, 15 Shaft
16 Control part
17 Communication part
20, 21 Wheel
22 Caster
23 Elevation mechanism
24 Load sensor
25 Angle sensor
26 Rotation drive part
27 Obstacle detection part
28 Position detection part
30 Contact part
31, 32 Plate member
33 Friction part
34, 35 Fork part
36, 37, 38, 39 Elastic member
40 Rotation mechanism
41 Arm
41a, 41b Pin part
42 Shaft part
43 Arm
44, 45, 46, 47 Stay
50 Restoration mechanism
51 Swing member
51a, 51b Receiving surface
51c Pin part
52 Shaft part
53 Pin part
54 Elastic member
60 Guide mechanism
61 Guide member
61a Guide surface
62, 63 Roller
64, 65 Support part
70 Pedestal
71, 72, 73, 74 Caster
80 Floor
81 Axle

What is claimed is:

1. A transport robot, being configured to transport a transported object(s) in a state of sandwiching the transported object(s) by cooperating with another transport robot when transporting the transported object(s),
wherein the transport robot comprises:
a main body;
a contact part that contacts the transported object(s); and a rotation mechanism having an arm(s), the contact part being attached to one end of the arm(s), and the arm(s) being rotatably supported to the main body in the vicinity of the other end of the arm(s), and wherein the rotation mechanism comprises a restoration mechanism that restores the arm(s) in a state of being rotated from a predetermined position so that the arm(s) is returned to the predetermined position using cams.

2. The transport robot according to claim 1, wherein:
the transport robot comprises a pair of wheels rotatably attached to both sides of the main body; and
the rotation mechanism makes the arm rotatable relative to the main body about an axis passing through a midpoint of width between the pair of wheels.

3. The transport robot according to claim 1, further comprising:
a guide mechanism that is attached to the main body, wherein the guide mechanism is configured to guide the rotation of the contact part relative to the main body and support pressing of the contact part to the transported object.

4. The transport robot according to claim 2, further comprising:
a pair of drive parts that are attached to the main body and drive the pair of wheels;
a control part that controls the pair of drive parts; and
a communication part,
wherein the control part is connected communicably with the other transport robot via the communication part, and controls the pair of drive parts by cooperating with the other transport robot.

5. The transport robot according to claim 4, further comprising a load sensor that detects a load when the contact part and the transported object contact each other,
wherein a state in which the contact part and the transported object come into contact, the control part controls the pair of drive parts so that the load falls within a predetermined numerical range based on the load detected by the load sensor.

6. The transport robot according to claim 4, further comprising an angle sensor that detects a rotation angle of the arm relative to the main body,
wherein the control part controls the pair of drive parts so that the rotation angle of the arm relative to the main body becomes an angle set depending on a traveling direction based on the angle detected by the angle sensor.

7. A transport system that comprises a plurality of transport robots that transport a transported object(s), being configured to transport the transported object(s) in a state of sandwiching the transported object(s) by cooperating with a plurality of transport robots when transporting the transported object(s),
wherein the transport robot comprises:
a main body;
a contact part that contacts the transported object(s); and
a rotation mechanism having an arm(s), the contact part being attached to one end of the arm(s), and the arm(s) being rotatably supported to the main body in the vicinity of the other end of the arm(s), and
wherein the rotation mechanism comprises a restoration mechanism that restores the arm(s) in a state being rotated from a predetermined position so that the arm(s) is returned to the predetermined position using cams.

8. A transport method that uses a plurality of transport robots to transport a transported object(s), wherein the transport method comprises transporting the transported object(s) in a state of sandwiching the transported object(s) by cooperating with a plurality of transport robots when transporting the transported object(s),
wherein the transport robot comprises:
a main body;
a contact part that contacts the transported object(s); and
a rotation mechanism having an arm(s), the contact part being attached to one end of the arm(s), and the arm(s) being rotatably supported to the main body in the vicinity of the other end of the arm(s), and
wherein the rotation mechanism comprises a restoration mechanism that restores the arm(s) in a state being rotated from a predetermined position so that the arm(s) is returned to the predetermined position using cams.

* * * * *